United States Patent
Ikuta et al.

(10) Patent No.: US 10,664,043 B2
(45) Date of Patent: May 26, 2020

(54) IMAGE DISPLAY SYSTEM, AND CONTROL APPARATUS FOR HEAD-MOUNTED DISPLAY AND OPERATION METHOD THEREFOR

(71) Applicant: FUJIFILM Corporation, Tokyo (JP)

(72) Inventors: Mayuko Ikuta, Tokyo (JP); Yuki Okabe, Tokyo (JP); Noriaki Ida, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/244,478

(22) Filed: Jan. 10, 2019

(65) Prior Publication Data

US 2019/0146578 A1    May 16, 2019

Related U.S. Application Data

(63) Continuation of application No. PCT/JP2017/022488, filed on Jun. 19, 2017.

(30) Foreign Application Priority Data

Jul. 12, 2016    (JP) .................................. 2016-137813

(51) Int. Cl.
*G06F 3/01*     (2006.01)
*G06F 3/0481*   (2013.01)
(Continued)

(52) U.S. Cl.
CPC .............. *G06F 3/011* (2013.01); *G06F 3/017* (2013.01); *G06F 3/04815* (2013.01); *G06F 3/04847* (2013.01); *G06T 19/006* (2013.01)

(58) Field of Classification Search
CPC ...... G06F 3/011; G06F 3/017; G06F 3/04815; G06F 3/04847; G06T 19/006
(Continued)

(56) References Cited

U.S. PATENT DOCUMENTS

2009/0282362 A1    11/2009  Matsumoto
2012/0042246 A1    2/2012   Schwesinger et al.
(Continued)

FOREIGN PATENT DOCUMENTS

DE    102014224599 A1    6/2016
JP    2006-146803 A      6/2006
(Continued)

OTHER PUBLICATIONS

International Search Report issued in PCT/JP2017/022488; dated Aug. 29, 2017.
(Continued)

*Primary Examiner* — Tony O Davis
(74) *Attorney, Agent, or Firm* — Studebaker & Brackett PC

(57) ABSTRACT

A second detection unit detects a second gesture for switching between a rough adjustment mode in which the range of settable numerical values for a slide bar is a first range or/and the unit change width for a numerical value is a first change width and a fine adjustment mode in which the range is a second range narrower than the first range or/and the unit change width is a second change width narrower than the first change width. A mode switching unit switches between the rough adjustment mode and the fine adjustment mode in accordance with the second gesture. A display control unit causes a rough adjustment slide bar and a fine adjustment slide bar to be selectively displayed on an HMD.

20 Claims, 29 Drawing Sheets

(51) Int. Cl.
*G06F 3/0484* (2013.01)
*G06T 19/00* (2011.01)

(58) Field of Classification Search
USPC .......................................... 345/156–159, 690
See application file for complete search history.

(56) References Cited

U.S. PATENT DOCUMENTS

| | | |
|---|---|---|
| 2013/0097551 A1 | 4/2013 | Hogan |
| 2014/0333522 A1 | 11/2014 | Gotschlich |
| 2016/0034039 A1 | 2/2016 | Maeda et al. |
| 2016/0054797 A1 | 2/2016 | Tokubo et al. |
| 2016/0320863 A1 | 11/2016 | Shimoda |

FOREIGN PATENT DOCUMENTS

| | | |
|---|---|---|
| JP | 2009-295147 A | 12/2009 |
| JP | 2013-529802 A | 7/2013 |
| JP | 2014-186361 A | 10/2014 |
| JP | 2015-119373 A | 6/2015 |

OTHER PUBLICATIONS

Written Opinion issued in PCT/JP2017/022488; dated Aug. 29, 2017.
The extended European search report issued by the European Patent Office dated Jun. 13, 2019, which corresponds to European Patent Application No. 17827337.1-1216 and is related to U.S. Appl. No. 16/244,478.
An Office Action mailed by the Japanese Patent Office dated Oct. 23, 2019, which corresponds to Japanese Patent Application No. 2018-527465 and is related to U.S. Appl. No. 16/244,478; with English language translation.

FIG. 9
| THIRD CORRESPONDENCE INFORMATION 63 | | |
|---|---|---|
| MODE | RANGE | UNIT CHANGE WIDTH |
| ROUGH ADJUSTMENT MODE | ENTIRE SETTABLE RANGE (FIRST RANGE) | ±10 (FIRST CHANGE WIDTH) |
| FINE ADJUSTMENT MODE | ONE-FIFTH OF ENTIRE SETTABLE RANGE (SECOND RANGE) | ±1 (SECOND CHANGE WIDTH) |
FIG. 10
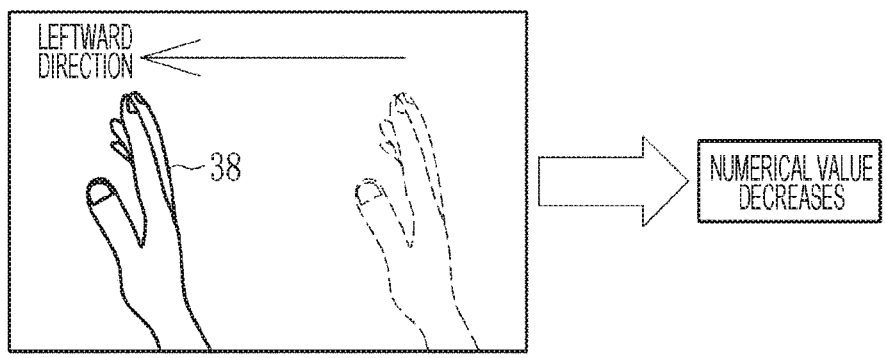
FIG. 11
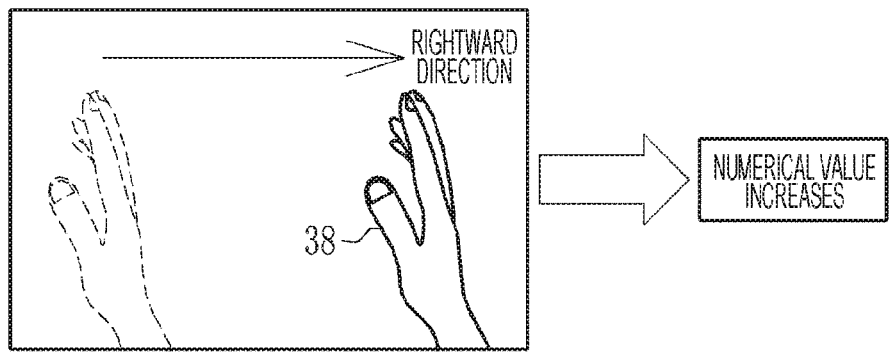
FIG. 12
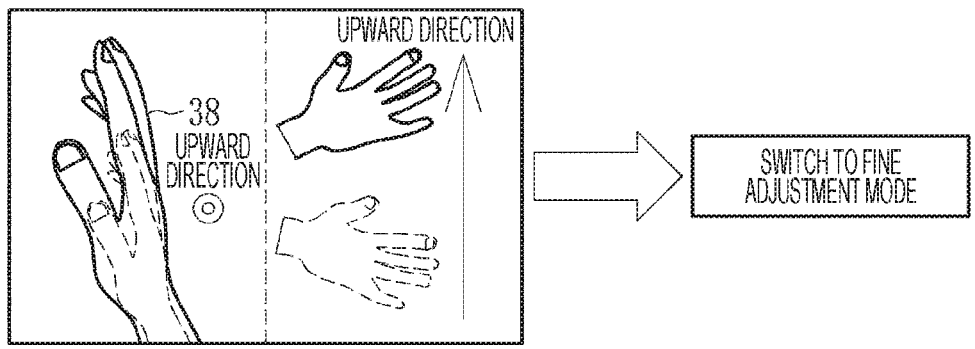

<FINE ADJUSTMENT MODE>

| FIRST CORRESPONDENCE INFORMATION | |
|---|---|
| MOVEMENT DIRECTION OF HAND | GESTURE TYPE |
| LEFTWARD DIRECTION | FIRST GESTURE |
| RIGHTWARD DIRECTION | |
| LEFTWARD DIRECTION TO RIGHTWARD DIRECTION | SECOND GESTURE |
| RIGHTWARD DIRECTION TO LEFTWARD DIRECTION | |

FIG. 34

| THIRD CORRESPONDENCE INFORMATION ⌐96 | | |
|---|---|---|
| MODE | NUMBER OF SWITCHING GESTURES | UNIT CHANGE WIDTH |
| ROUGH ADJUSTMENT MODE | 0 | ±10 (FIRST CHANGE WIDTH) |
| FIRST FINE ADJUSTMENT MODE | 1 | ±5 (SECOND CHANGE WIDTH) |
| SECOND FINE ADJUSTMENT MODE | 2 OR MORE | ±1 (SECOND CHANGE WIDTH) |

IMAGE DISPLAY SYSTEM, AND CONTROL APPARATUS FOR HEAD-MOUNTED DISPLAY AND OPERATION METHOD THEREFOR

CROSS-REFERENCE TO RELATED APPLICATIONS

This application is a Continuation of PCT International Application No. PCT/JP2017/022488 filed on 19 Jun. 2017, which claims priority under 35 U.S.C. § 119(a) to Japanese Patent Application No. 2016-137813 filed on 12 Jul. 2016. The above application is hereby expressly incorporated by reference, in its entirety, into the present application.

BACKGROUND OF THE INVENTION

1. Field of the Invention

The present invention relates to an image display system, and a control apparatus for a head-mounted display and an operation method therefor.

2. Description of the Related Art

A technique is known in which a virtual image formed by using computer graphics is displayed on a head-mounted display (hereinafter referred to as "HMD") that is worn on the head of a user to allow the user to recognize an augmented reality space obtained by merging the real space with a virtual space. For example, JP2015-119373A (corresponding to US2016/0320863A1) describes a technique using a transparent HMD through which a user can visually recognize the real space with the naked eyes.

In JP2015-119373A, a virtual user interface (hereinafter referred to as "UI") that is virtually operated by a user is displayed as a virtual image. As the virtual UI, for example, virtual buttons for which a virtual touch operation using the finger of the user is performed are described. In JP2015-119373A, visual display, such as illuminating an operated virtual button, is performed. Accordingly, the user can visually recognize the virtual button that they operate.

Meanwhile, besides the virtual UI, such as the virtual buttons described in JP2015-119373A, a conventional UI that is displayed on the touch panel of a tablet terminal or the display of a personal computer and for which a touch operation or a mouse operation is performed is known. Such a conventional UI is hereinafter referred to as "non-virtual UI" so as to be distinguished from the virtual UI.

A large number of types of non-virtual UIs are available, and one of the non-virtual UIs is a numerical value setting UI that is used in a numerical value setting operation. The numerical value setting UI is constituted by a range display part that shows the range of settable numerical values and a numerical value indication part that points a currently set numerical value. A representative example of the numerical value setting UI is a slide bar. In the case of a slide bar, the range display part is a horizontal bar for which, for example, a lower limit value is indicated at the left end and an upper limit value is indicated at the right end, and the numerical value indication part is a slider for which a slide operation on the bar is performed.

SUMMARY OF THE INVENTION

On the numerical value setting UI, a numerical value is set by performing a touch operation or a mouse operation. However, it is often the case that the numerical value indication part repeatedly moves past a position corresponding to a numerical value to be set several times, so that numerical value setting takes time. Therefore, to set a numerical value quickly and accurately, a delicate operation needs to be performed.

Operations for a non-virtual UI include a touch operation and a mouse operation as described above, and these operations involve an act of touching an object that is actually present in the real space, such as touching a touch panel with a hand or holding a mouse and clicking a button. Therefore, the user can easily have an operational feel in terms of the sense of touch. Accordingly, a delicate operation can be relatively easily performed.

On the other hand, the virtual UI is recognized by a user as a UI that is virtually present in the real space. The user performs an operation for the virtual UI that is made to appear in the field of view by making a gesture in which, for example, the user extends their hand to touch the virtual UI. At this time, however, the user does not actually touch the virtual UI with their hand. Accordingly, in the operation for the virtual UI, the user has difficulty in having an operational feel in terms of the sense of touch, and therefore, the user relatively has difficulty in performing a delicate operation.

Implementation of the numerical value setting UI as the virtual UI is being studied. Here, it is relatively difficult to perform a delicate operation for the virtual UI as described above, and therefore, there is a possibility that numerical value setting takes more time than in the case of the non-virtual UI.

In JP2015-119373A, visual display, such as illuminating an operated virtual button, to indicate selection or non-selection is performed. However, it is not possible to address the issue that, for the numerical value setting UI, the user has difficulty in having an operational feel in terms of the sense of touch and has difficulty in performing a delicate operation.

An object of the present invention is to provide an image display system, and a control apparatus for a head-mounted display and an operation method therefor with which setting of a numerical value using a numerical value setting user interface, which is a virtual user interface, can be quickly and accurately performed.

To address the issue described above, an image display system according to an aspect of the present invention is an image display system including: a head-mounted display that is worn on a head of a user; and a control apparatus for the head-mounted display to allow the user to recognize, through the head-mounted display, an augmented reality space obtained by merging a real space with a virtual space. The image display system includes: a display control unit that causes at least one numerical value setting user interface to be displayed on the head-mounted display as a virtual user interface that is virtually recognized by the user in the augmented reality space, the numerical value setting user interface being constituted by a range display part that shows a range of settable numerical values and a numerical value indication part that points a numerical value, among the numerical values, that is currently set; a first detection unit that detects a first gesture made by the user for setting the numerical value; a second detection unit that detects a second gesture made by the user for switching between a rough adjustment mode and a fine adjustment mode, the rough adjustment mode being a mode in which the range is a first range or/and a unit change width for the numerical value is a first change width, the fine adjustment mode being a mode in which the range is a second range narrower than the first range or/and the unit change width is a second change width narrower than the first change width; a numerical value change unit that changes the numerical value in accordance with the first gesture; and a mode switching unit that switches between the rough adjustment mode and the fine adjustment mode in accordance with the second gesture.

It is preferable that the first detection unit and the second detection unit respectively detect the first gesture and the second gesture in a state where a hand of the user is not in contact with the numerical value setting user interface in the augmented reality space.

It is preferable that the display control unit cause the numerical value setting user interface to be displayed at a remote position that is out of reach of the hand of the user in the augmented reality space.

It is preferable that the first gesture include a first-direction gesture in which the hand of the user is moved in a first direction and a second-direction gesture in which the hand of the user is moved in a second direction opposite to the first direction, and the second gesture include a third-direction gesture in which the hand of the user is moved in a third direction different from the first direction and a fourth-direction gesture in which the hand of the user is moved in a fourth direction different from the second direction and opposite to the third direction.

It is preferable that the first detection unit detect presence of the hand of the user at a reference position and a direction in which the hand of the user moves from the reference position, and the numerical value change unit automatically change the numerical value from when movement of the hand of the user in one of the first direction or the second direction, is detected until when a return of the hand of the user to the reference position is detected.

It is preferable that the display control unit cause a rough adjustment interface for the rough adjustment mode and a fine adjustment interface for the fine adjustment mode to be displayed as the numerical value setting user interface.

It is preferable that the display control unit cause the rough adjustment interface and the fine adjustment interface to be selectively displayed.

It is preferable that the display control unit cause the fine adjustment interface to be displayed in a larger size on a nearer side than the rough adjustment interface in the augmented reality space.

It is preferable that the display control unit cause both the rough adjustment interface and the fine adjustment interface to be simultaneously displayed, and the display control unit put one of the rough adjustment interface or the fine adjustment interface into an active state where setting of the numerical value is accepted, and put the other into an inactive state where setting of the numerical value is not accepted.

It is preferable that the display control unit make a display mode of the rough adjustment interface and a display mode of the fine adjustment interface differ in the active state and in the inactive state.

It is preferable that, in a case where the numerical value reaches an upper limit value or a lower limit value of the second range on the fine adjustment interface, and thereafter, the first gesture is further detected, the display control unit change display of the second range of the range display part.

It is preferable that the first gesture include a first-direction gesture in which the hand of the user is moved in a first direction and a second-direction gesture in which the hand of the user is moved in a second direction opposite to the first direction, the second gesture be a switching gesture in which a movement direction of the hand of the user is switched from one of the first direction or the second direction to the other, and the mode switching unit make the unit change width used after the switching gesture narrower than the unit change width used before the switching gesture.

It is preferable that the display control unit make a display mode of the numerical value indication part differ in a case where the first gesture is detected and in a case where the first gesture is not detected.

It is preferable that the numerical value setting user interface be a slide bar constituted by a bar that functions as the range display part and a slider that functions as the numerical value indication part and for which a slide operation on the bar is performed.

It is preferable that the display control unit cause a virtual object for which a display position in the real space is fixed to be displayed on the head-mounted display in addition to the numerical value setting user interface, and in a case where a size of a part of the virtual object, the part being hidden behind the numerical value setting user interface in the augmented reality space, is equal to or larger than a set size, the display control unit change a display position of the numerical value setting user interface to a position so as not to hide the virtual object.

It is preferable that the first detection unit and the second detection unit recognize the hand of the user by analyzing a captured image of the hand of the user, and respectively detect the first gesture and the second gesture made by using the recognized hand of the user.

It is preferable that the first detection unit and the second detection unit recognize the hand of the user from a glove that is worn on the hand of the user.

It is preferable that the image display system further include a mask processing unit that masks a part of the numerical value setting user interface, the part overlapping with the recognized hand of the user.

A control apparatus for a head-mounted display according to an aspect of the present invention is a control apparatus for a head-mounted display that is worn on a head of a user to allow the user to recognize an augmented reality space obtained by merging a real space with a virtual space, including: a display control unit that causes at least one numerical value setting user interface to be displayed on the head-mounted display as a virtual user interface that is virtually recognized by the user in the augmented reality space, the numerical value setting user interface being constituted by a range display part that shows a range of settable numerical values and a numerical value indication part that points a numerical value, among the numerical values, that is currently set; a first detection unit that detects a first gesture made by the user for setting the numerical value; a second detection unit that detects a second gesture made by the user for switching between a rough adjustment mode and a fine adjustment mode, the rough adjustment mode being a mode in which the range is a first range or/and a unit change width for the numerical value is a first change width, the fine adjustment mode being a mode in which the range is a second range narrower than the first range or/and the unit change width is a second change width narrower than the first change width; a numerical value change unit that changes the numerical value in accordance with the first gesture; and a mode switching unit that switches between the rough adjustment mode and the fine adjustment mode in accordance with the second gesture.

An operation method for a control apparatus for a head-mounted display according to an aspect of the present invention is an operation method for a control apparatus for a head-mounted display that is worn on a head of a user to allow the user to recognize an augmented reality space obtained by merging a real space with a virtual space, including: a display control step of causing at least one numerical value setting user interface to be displayed on the head-mounted display as a virtual user interface that is virtually recognized by the user in the augmented reality space, the numerical value setting user interface being constituted by a range display part that shows a range of settable numerical values and a numerical value indication part that points a numerical value, among the numerical values, that is currently set; a first detection step of detecting a first gesture made by the user for setting the numerical value; a second detection step of detecting a second gesture made by the user for switching between a rough adjustment mode and a fine adjustment mode, the rough adjustment mode being a mode in which the range is a first range or/and a unit change width for the numerical value is a first change width, the fine adjustment mode being a mode in which the range is a second range narrower than the first range or/and the unit change width is a second change width narrower than the first change width; a numerical value change step of changing the numerical value in accordance with the first gesture; and a mode switching step of switching between the rough adjustment mode and the fine adjustment mode in accordance with the second gesture.

According to the present invention, switching between the rough adjustment mode in which the range of settable numerical values for the numerical value setting user interface, which is a virtual user interface, is the first range or/and the unit change width for a numerical value is the first change width, and the fine adjustment mode in which the range is the second range narrower than the first range or/and the unit change width is the second change width narrower than the first change width is performed in accordance with a gesture made by a user. Accordingly, it is possible to provide an image display system, and a control apparatus for a head-mounted display and an operation method therefor with which setting of a numerical value using a numerical value setting user interface, which is a virtual user interface, can be quickly and accurately performed.

BRIEF DESCRIPTION OF THE DRAWINGS

FIG. 9 is a diagram illustrating third correspondence information;

FIG. 10 is a diagram illustrating a relationship between a gesture and a change in a numerical value;

FIG. 11 is a diagram illustrating a relationship between a gesture and a change in a numerical value;

FIG. 12 is a diagram illustrating a relationship between a gesture and mode switching;

FIG. 34 is a diagram illustrating third correspondence information according to the fifth embodiment;

DESCRIPTION OF THE PREFERRED EMBODIMENTS

First Embodiment

Figure 1:
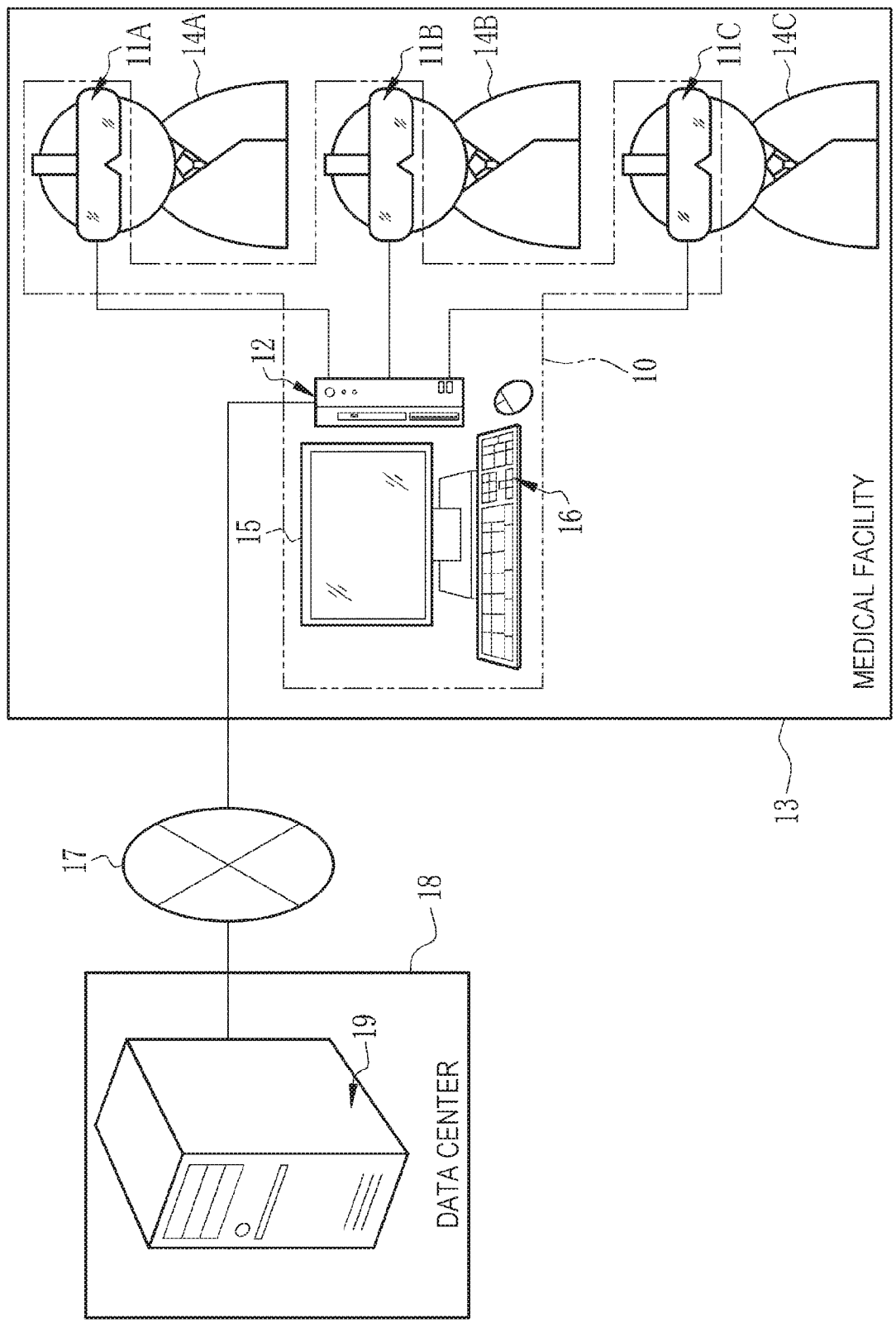
FIG. 1 is a diagram illustrating an image display system and an image accumulation server.

In FIG. 1, an image display system 10 includes HMDs 11A, 11B, and 11C and a control apparatus 12 and is placed in a medical facility 13. The HMD 11A is worn on the head of a user 14A, the HMD 11B is worn on the head of a user 14B, and the HMD 11C is worn on the head of a user 14C. The users 14A to 14C are medical staff members including doctors and nurses who belong to the medical facility 13. Note that the head is a part of the human body that is located above the neck of the human body in a standing position state, and is a part that includes the face and so on. Hereinafter, the HMDs 11A to 11C may be collectively referred to as HMDs 11 and the users 14A to 14C may be collectively referred to as users 14 in a case where these need not be specifically distinguished from each other.

The control apparatus 12 is, for example, a desktop personal computer and has a display 15 and an input device 16 constituted by a keyboard and a mouse. The display 15 displays a screen that is used in operations performed via the input device 16. The screen used in operations constitutes a GUI (graphical user interface). The control apparatus 12 accepts an operation instruction input from the input device 16 through the screen of the display 15.

The control apparatus 12 is connected to an image accumulation server 19 in a data center 18 via a network 17 so as to allow communication with each other. The network 17 is, for example, a WAN (wide area network), such as the Internet or a public communication network. On the network 17, a VPN (virtual private network) is formed or a communication protocol having a high security level, such as HTTPS (Hypertext Transfer Protocol Secure), is used by taking into consideration information security.

The image accumulation server 19 accumulates various medical images of patients obtained in the medical facility 13 and distributes the medical images to the medical facility 13. The medical images include, for example, a three-dimensional volume rendering image (hereinafter referred to as "3D image") 40 (see FIG. 3) obtained by re-forming CT (computed tomography) scan images through image processing. A medical image can be retrieved by using a patient ID (identification data), which is an ID for identifying each patient, an image ID, which is an ID for identifying each medical image, the type of modality used to capture the medical image, or the image capture date and time as a search key.

The image accumulation server 19 searches for a medical image that corresponds to a search key in response to a distribution request including the search key from the medical facility 13, and distributes the retrieved medical image to the medical facility 13. Note that, in FIG. 1, only one medical facility 13 is connected to the image accumulation server 19; however, the image accumulation server 19 is actually connected to a plurality of medical facilities 13, and collects and manages medical images from the plurality of medical facilities 13.

Figure 2:
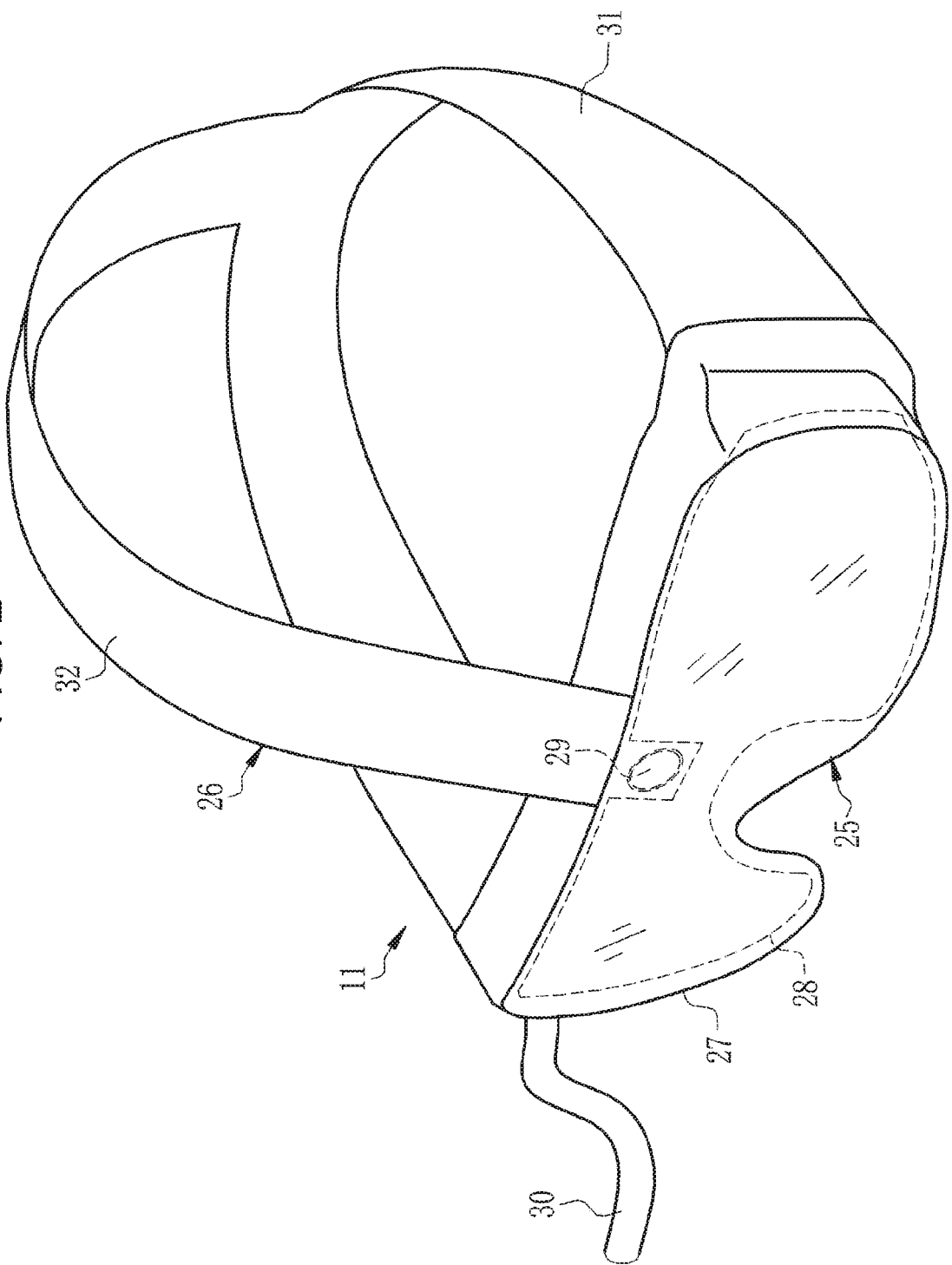
FIG. 2 is a perspective external view of a head-mounted display.

In FIG. 2, the HMD 11 is constituted by a main body part 25 and a band part 26. The main body part 25 is located in front of the eyes of the user 14 when the user 14 is wearing the HMD 11. The band part 26 is fixed to the upper half of the head of the user 14 when the user 14 is wearing the HMD 11.

The main body part 25 includes a protective frame 27, a screen 28, and a camera 29. The protective frame 27 has a goggle form to entirely cover the both eyes of the user 14 and is formed of transparent colored glass or plastic. Although not illustrated, polyurethane foam is attached to a part of the protective frame 27 that is in contact with the face of the user 14.

The screen 28 and the camera 29 are disposed on the inner side of the protective frame 27. The screen 28 has an eyeglasses form and is formed of a transparent material similarly to the protective frame 27. The user 14 visually recognizes a real space RS (see FIG. 4) with the naked eyes through the screen 28 and the protective frame 27. That is, the HMD 11 is of a transparent type.

On the inside surface of the screen 28 that faces the eyes of the user 14, a virtual image formed by using computer graphics is projected and displayed by a projection part (not illustrated). As is well known, the projection part is constituted by a display element, such as a liquid crystal, for displaying a virtual image and a projection optical system that projects the virtual image displayed on the display element onto the inside surface of the screen 28. The virtual image is reflected by the inside surface of the screen 28 and is visible to the user 14. Accordingly, the user 14 recognizes the virtual image as a virtual image in a virtual space VS (see FIG. 4).

The virtual image includes a virtual object that is recognized by the user 14 in an augmented reality space ARS (see FIG. 3) similarly to an actual object that is present in the real space RS, and a virtual UI that is virtually operated by the user 14 in the augmented reality space ARS. The virtual object is, for example, the 3D image 40 of the upper half of a patient. The 3D image 40 is colored such that, for example, the skin is colored in a skin color, the bone is colored gray, and the liver is colored reddish brown. The virtual UI is, for example, a slide bar 45 (see FIG. 5), which is a type of numerical value setting UI used in an operation for numerical value setting. The user 14 makes gestures using a hand 38, which is the hand thereof (see FIG. 3) to operate the virtual UI.

The camera 29 is provided, for example, at the center of the upper part of the main body part 25 that faces the glabella of the user 14 when the user 14 is wearing the HMD 11. The camera 29 captures, at a predetermined frame rate (for example, 30 frames/second), an image of the field of view that is substantially the same as the augmented reality space ARS recognized by the user 14 through the HMD 11. The camera 29 successively transmits captured images to the control apparatus 12. The user 14 makes a gesture for the virtual UI using the hand 38 of the user 14 within the field of view of the camera 29. Note that the example case of the HMD 11 of a transparent type has been described here; however, a non-transparent-type HMD that superimposes a virtual image on a captured image of the real space RS output from the camera 29 and that projects and displays the resulting image on the inside surface of the screen 28 may be used.

To the main body part 25, one end of a cable 30 is connected. The other end of the cable 30 is connected to the control apparatus 12. The HMD 11 communicates with the control apparatus 12 via the cable 30. Note that communication between the HMD 11 and the control apparatus 12 need not be wired communication using the cable 30 and may be wireless communication.

The band part 26 is a belt-like strip having a width of approximately several centimeters and is constituted by a horizontal band 31 and a vertical band 32. The horizontal band 31 is wound so as to extend along the temples and the back of the head of the user 14. The vertical band 32 is wound so as to extend along the forehead, the parietal region of the head, and the back of the head of the user 14. To the horizontal band 31 and the vertical band 32, buckles not illustrated are attached so that the lengths are adjustable.

Figure 3:
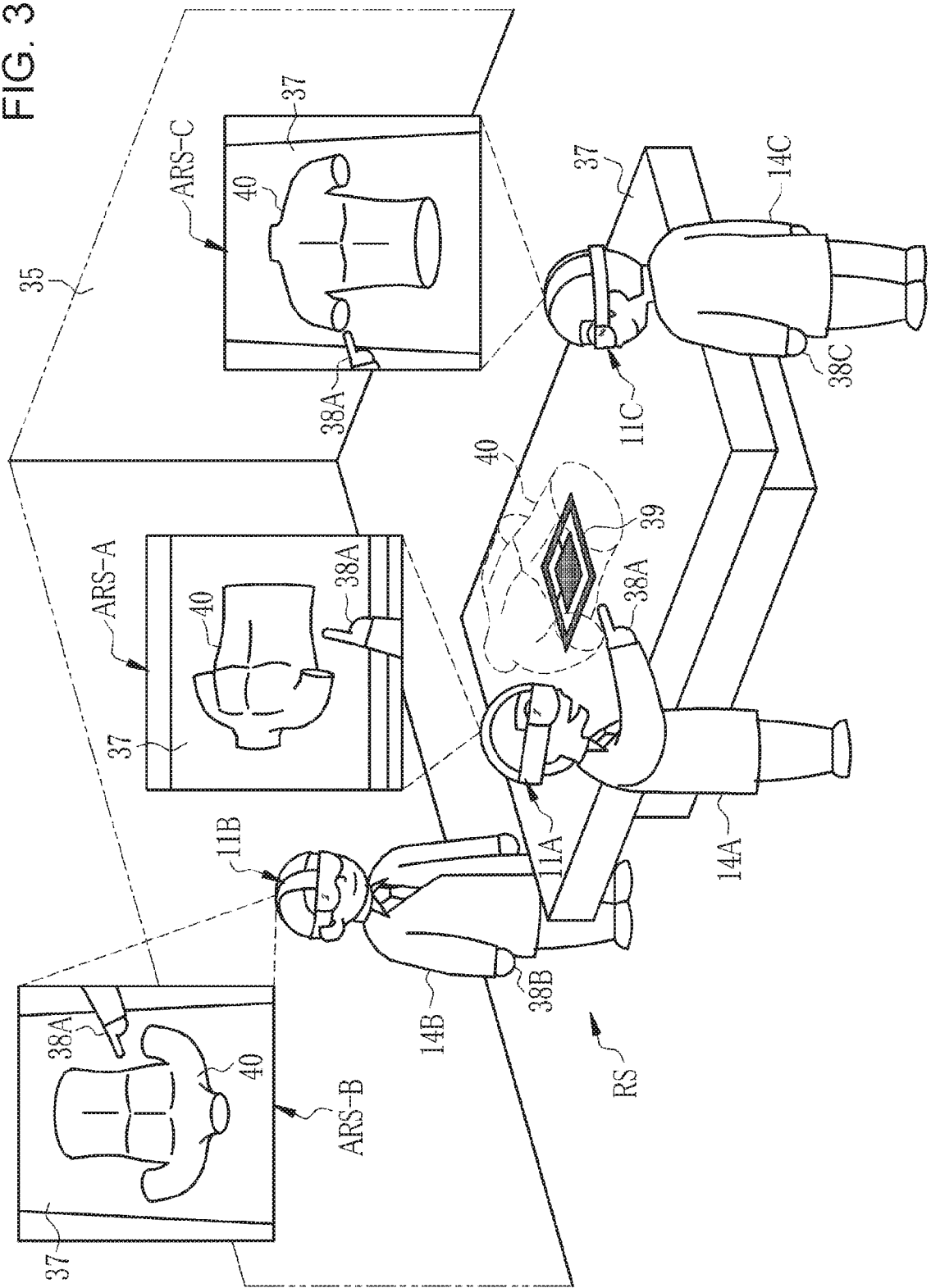
FIG. 3 is a diagram illustrating a state of a conference using the image display system.

FIG. 3 illustrates a state where the users 14A to 14C gather together in an operating room 35 of the medical facility 13 to hold a conference for discussing a surgical operation plan for a patient for which a surgical operation is scheduled (hereinafter referred to as "target patient"). The users 14A to 14C respectively recognize augmented reality spaces ARS-A, ARS-B, and ARS-C through the HMDs 11A to 11C. Note that, in FIG. 3, the control apparatus 12 and the cable 30 are omitted.

In the operating room 35, an operation table 37 is placed. The user 14A stands near the center of one of the long sides of the operation table 37, the user 14B stands by one of the short sides of the operation table 37, and the user 14C stands by the other short side of the operation table 37 (on the side opposite the user 14B). The user 14A explains the condition and so on of the target patient to the users 14B and 14C while pointing a hand 38A at the operation table 37. Note that, hereinafter, the hands 38A, 38B, and 38C of the respective users 14A to 14C may be collectively referred to as hands 38 similarly to the HMDs 11 and the users 14.

On the operation table 37, a marker 39 is laid. The marker 39 is, for example, a sheet having a square frame on which a regular pattern in white and black and identification lines for identifying the top, the bottom, the left, and the right are drawn. The marker 39 indicates a position in the real space RS at which a virtual object appears. That is, the display position of a virtual object is fixed to the marker 39 that is present in the real space RS.

FIG. 3 illustrates a state where the 3D image 40 of the upper half of the target patient lying on their back is displayed on the marker 39 as a virtual object. The 3D image 40 is arranged such that the body axis extends along the long sides of the operation table 37, the neck is located on the side of the user 14B, and the lumbar part is located on the side of the user 14C. In the augmented reality spaces ARS-A to ARS-C, the marker 39 is hidden behind the 3D image 40 and is not displayed.

The users 14A to 14C perform various processes for the 3D image 40, such as performing an abdominal operation using a virtual surgical knife and making an affected part for which a surgical operation is scheduled be directly visually recognizable through the layers of skin, subcutaneous tissue, and bones. The processes for the 3D image 40 are performed by, for example, one representative user 14 (here, the user 14A) who is authorized to perform the processes because the plurality of users 14 simultaneously performing the processes may lead to confusion. Note that, in the real space RS, the 3D image 40 is not present on the operation table 37 and only the marker 39 is laid, and therefore, the 3D image 40 is represented by a dashed line and the marker 39 is represented by a solid line on the operation table 37.

The display position of the 3D image 40 in the real space RS is fixed to the marker 39, and the users 14A to 14C stand at different positions. Therefore, the 3D image 40 looks different in the augmented reality spaces ARS-A to ARS-C respectively recognized by the users 14A to 14C. Specifically, the user 14A sees the 3D image 40 in which the right side of the body is located on the near side and the neck is located on the left side. The user 14B sees the 3D image 40 in which the neck is located on the near side and the lumbar part is located on the far side. To the contrary, the user 14C sees the 3D image 40 in which the lumbar part is located on the near side and the neck is located on the far side.

For example, when the user 14 comes closer to the marker 39, the 3D image 40 is enlarged and displayed as the user 14 comes closer. To the contrary, when the user 14 moves away from the marker 39, the 3D image 40 is reduced and displayed as the user 14 moves away. Accordingly, the display of the 3D image 40 changes in accordance with the three-dimensional positional relationship between the HMD 11 (user 14) and the marker 39.

As a matter of course, the operation table 37, the hand 38A of the user 14A, and so on, which are actual objects in the real space RS, look different in the augmented reality spaces ARS-A to ARS-C respectively recognized by the users 14A to 14C. For example, the user 14A sees the hand 38A of the user 14A on the near side, the user 14B sees the hand 38A of the user 14A on the right side, and to the contrary, the user 14C sees the hand 38A of the user 14A on the left side.

Figure 4:
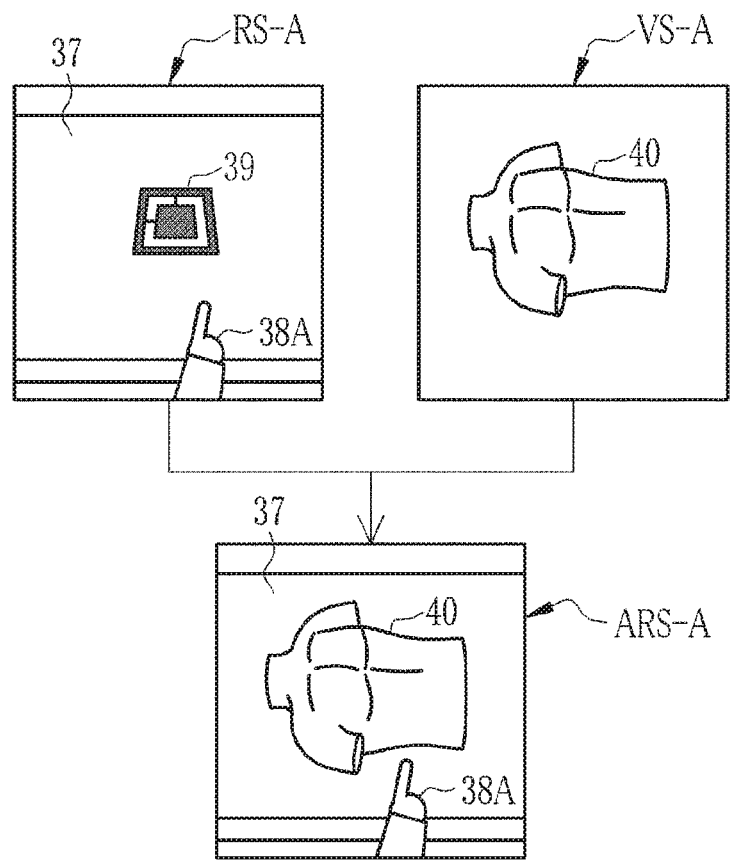
FIG. 4 is a diagram for describing the way in which an augmented reality space is organized.

FIG. 4 illustrates the way in which, for example, the augmented reality space ARS-A recognized by the user 14A is organized. The user 14A visually recognizes, through the screen 28 and the protective frame 27 of the HMD 11A, the real space RS-A in which the operation table 37, the hand 38A of the user 14A, and the marker 39 are present. In addition, the user 14A visually recognizes, on the inside surface of the screen 28, the virtual space VS-A in which the 3D image 40 is present. Accordingly, the user 14A recognizes the augmented reality space ARS-A obtained by merging the real space RS-A with the virtual space VS-A.

Figure 5:
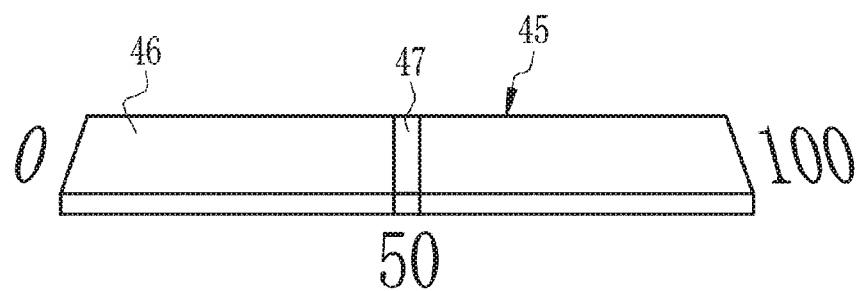
FIG. 5 is a diagram illustrating a slide bar.

In a case of performing various processes for the 3D image 40, a situation often occurs in which a numerical value is set, that is, for example, the display brightness of the 3D image 40 is changed or the transmittance of a layer, such as the skin, is changed. In this embodiment, in such a case of numerical value setting, the slide bar 45 illustrated in FIG. 5 is used as a virtual UI.

The slide bar 45 is constituted by a horizontal bar 46 for which a lower limit value is indicated at the left end and an upper limit value is indicated at the right end, and a slider 47 for which a slide operation on the bar 46 is performed. Below the slider 47, a numerical value that is currently set is displayed. In FIG. 5, the lower limit value is 0, the upper limit value is 100, and the currently set numerical value is 50. The bar 46 corresponds to a range display part that shows the range of settable numerical values, and the slider 47 corresponds to a numerical value indication part that points a currently set numerical value.

Unlike the 3D image 40 for which the display position is fixed to the marker 39 that is present in the real space RS, the display position of the slide bar 45 is fixed to a predetermined position in the virtual space VS. Therefore, in the augmented reality space ARS, the slide bar 45 is always displayed at the same position and in the same size.

Figure 6:
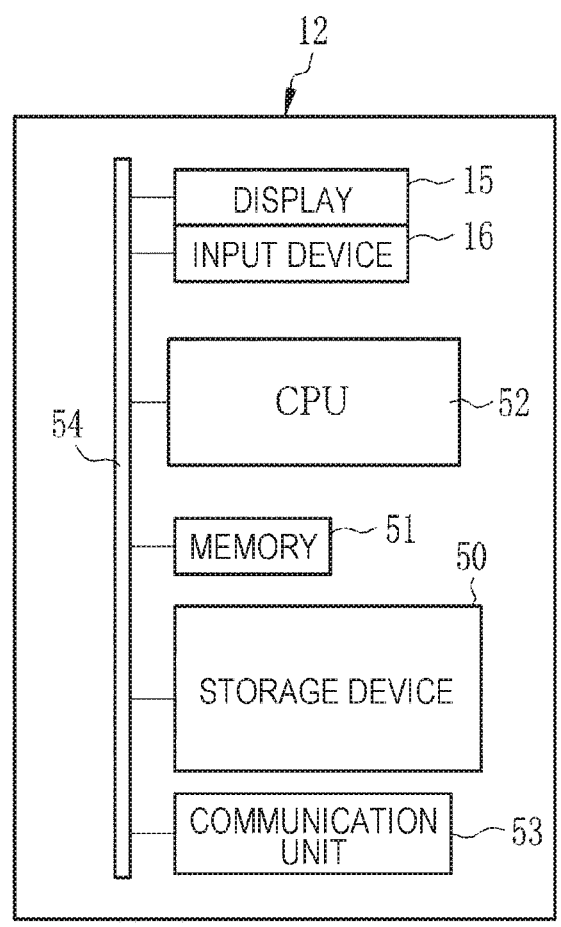
FIG. 6 is a block diagram illustrating a computer that constitutes a control apparatus.

In FIG. 6, the control apparatus 12 includes a storage device 50, a memory 51, a CPU (central processing unit) 52, and a communication unit 53 in addition to the display 15 and the input device 16 described above. These are connected to one another via a data bus 54.

The storage device 50 is a hard disk drive or a disk array constituted by a plurality of hard disk drives, which is built in the control apparatus 12 or is connected to the control apparatus 12 via a cable or a network. In the storage device 50, a control program, such as an operating system, various application programs, various types of data associated with these programs, and so on are stored. Virtual UIs including the slide bar 45 are also stored in the storage device 50.

The memory 51 is a work memory used by the CPU 52 to perform processing. The CPU 52 loads a program stored in the storage device 50 to the memory 51 and performs processing in accordance with the program to thereby centrally control each unit of the control apparatus 12. The communication unit 53 is responsible for various types of data communication between the HMD 11 and the image accumulation server 19.

Figure 7:
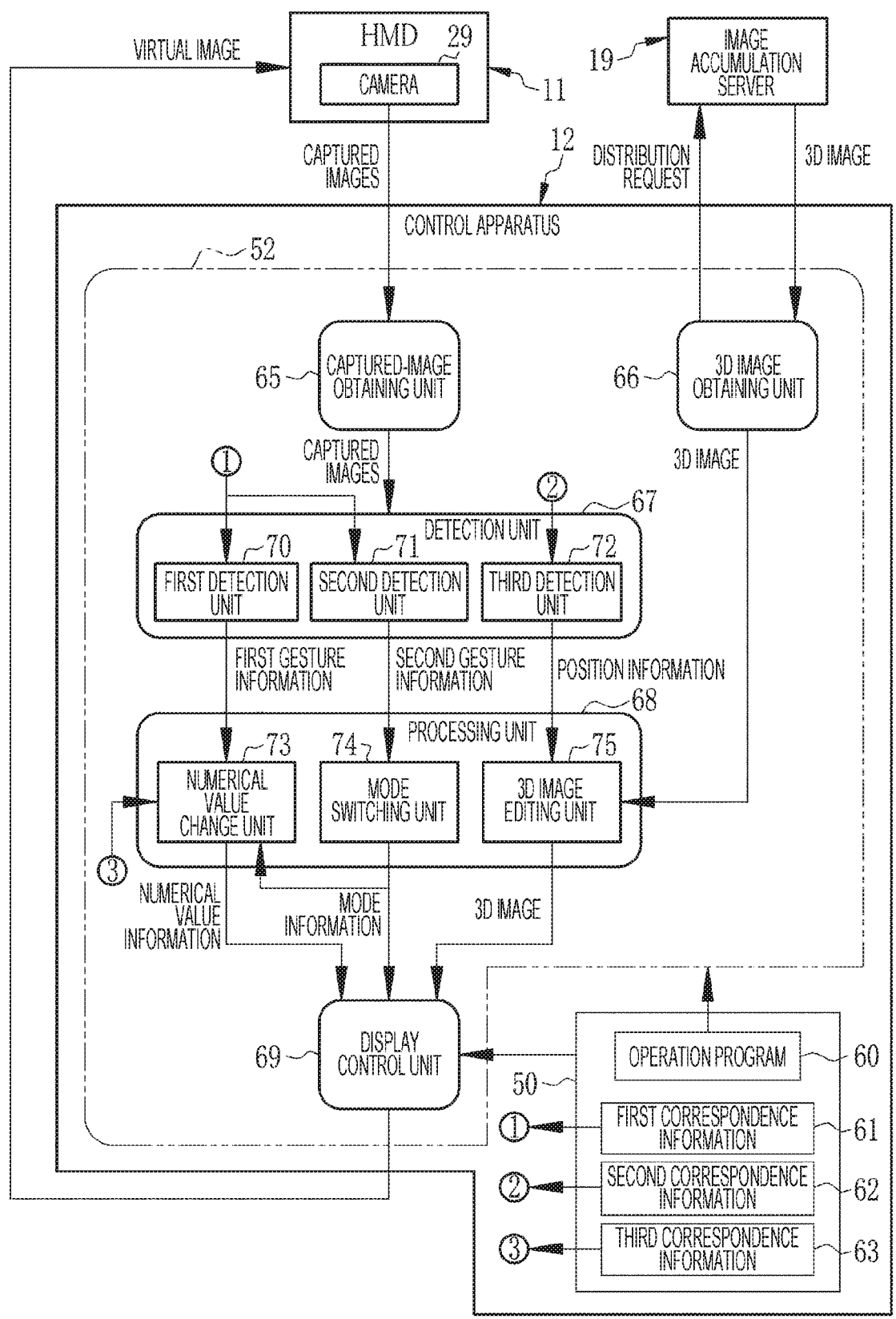
FIG. 7 is a block diagram illustrating functional units of a CPU of the control apparatus.

In FIG. 7, in the storage device 50, an operation program 60 is stored. The operation program 60 is an application program for causing the computer that constitutes the control apparatus 12 to function as a control apparatus for the HMD 11. In the storage device 50, first correspondence information 61 (see FIG. 8), second correspondence information 62, and third correspondence information 63 (see FIG. 9) are stored in addition to the operation program 60.

When the operation program 60 is activated, the CPU 52 works together with the memory 51 and so on to function as a captured-image obtaining unit 65, a 3D image obtaining unit 66, a detection unit 67, a processing unit 68, and a display control unit 69.

The captured-image obtaining unit 65 obtains captured images successively transmitted from the camera 29 of the HMD 11 at a predetermined frame rate. The captured-image obtaining unit 65 outputs the obtained captured images to the detection unit 67.

The 3D image obtaining unit 66 transmits a distribution request for the 3D image 40 of the target patient to the image accumulation server 19. The 3D image obtaining unit 66 obtains the 3D image 40 of the target patient transmitted from the image accumulation server 19 in response to the distribution request. The 3D image obtaining unit 66 outputs the obtained 3D image 40 to a 3D image editing unit 75 of the processing unit 68. Note that a search key for the 3D image 40 included in the distribution request is input via the input device 16.

The detection unit 67 performs various types of detection based on the captured images from the captured-image obtaining unit 65. The detection unit 67 has a first detection unit 70, a second detection unit 71, and a third detection unit 72.

The first detection unit 70 is responsible for a first detection function of detecting a first gesture using the hand 38 of the user 14. The first gesture is a gesture for setting a numerical value using the slide bar 45.

The first detection unit 70 recognizes the hand 38 in captured images by using a well-known image recognition technique, compares the positions of the recognized hand 38 for every predetermined number of frames, and detects the movement direction of the hand 38. Then, the first detection unit 70 determines whether the detected movement direction of the hand 38 corresponds to the first gesture by referring to the first correspondence information 61. In a case where the first detection unit 70 determines that the detected movement direction of the hand 38 corresponds to the first gesture, the first detection unit 70 outputs information about the first gesture (hereinafter referred to as "first gesture information") to a numerical value change unit 73 of the processing unit 68. Specifically, the first gesture information includes the movement direction and the movement amount of the hand 38.

The second detection unit 71 is responsible for a second detection function of detecting a second gesture using the hand 38 of the user 14. The second gesture is a gesture for switching a mode for numerical value setting using the slide bar 45. The mode includes a rough adjustment mode and a fine adjustment mode. The rough adjustment mode is a mode in which the range of settable numerical values for the slide bar 45 is a first range, and the unit change width for a numerical value is a first change width. The fine adjustment mode is a mode in which the range is a second range narrower than the first range, and the unit change width is a second change width narrower than the first change width.

The second detection unit 71 recognizes the hand 38 in captured images by using a well-known image recognition technique, compares the positions of the recognized hand 38 for every predetermined number of frames, and detects the movement direction of the hand 38 similarly to the first detection unit 70. Then, the second detection unit 71 determines whether the detected movement direction of the hand 38 corresponds to the second gesture by referring to the first correspondence information 61. In a case where the second detection unit 71 determines that the detected movement direction of the hand 38 corresponds to the second gesture, the second detection unit 71 outputs information about the second gesture (hereinafter referred to as "second gesture information") to a mode switching unit 74 of the processing unit 68. Specifically, the second gesture information includes the movement direction of the hand 38.

The third detection unit 72 recognizes the marker 39 in a captured image by using a well-known image recognition technique similarly to the first detection unit 70 and the second detection unit 71. Then, the third detection unit 72 detects the length and angle of each side of the square that forms the marker 39 in the captured image and the positions of the identification lines for identifying the top, the bottom, the left, and the right, and detects the three-dimensional position of the HMD 11 (the eye of the user 14) relative to the marker 39 on the basis of these pieces of detected information and the second correspondence information 62. The third detection unit 72 outputs information about the detected position (hereinafter referred to as "position information") to the 3D image editing unit 75 of the processing unit 68.

The position information includes, for example, the position coordinates of the HMD 11 in a three-dimensional space in which the origin corresponds to the center of the marker 39. The second correspondence information 62 is a mathematical expression that is used to calculate the position coordinates of the HMD 11 in the three-dimensional space in which the origin corresponds to the center of the marker 39. In this mathematical expression, for example, the length and angle of each side of the square that forms the marker 39 in the captured image and the positions of the identification lines for identifying the top, the bottom, the left, and the right are variables. Note that the three-dimensional space in which the origin corresponds to the center of the marker 39 is a three-dimensional space in which the origin corresponds to the center of the marker 39, the XY plane corresponds to a flat surface on which the marker 39 is placed (in this case, the upper surface of the operation table 37), and the Z axis corresponds to an axis orthogonal to the flat surface on which the marker 39 is placed.

In addition to the first detection unit 70 that detects the first gesture and the second detection unit 71 that detects the second gesture, the detection unit 67 also has a detection unit that detects a gesture, other than the first gesture and the second gesture, for, for example, giving an instruction for ending numerical value setting.

The processing unit 68 performs various processes based on various types of information from the detection unit 67. The processing unit 68 has the numerical value change unit 73, the mode switching unit 74, and the 3D image editing unit 75.

The numerical value change unit 73 is responsible for a numerical value change function of changing a numerical value on the slide bar 45 on the basis of the third correspondence information 63 in accordance with the first gesture information from the first detection unit 70. The numerical value change unit 73 outputs information about the numerical value (hereinafter referred to as "numerical value information") to the display control unit 69.

The mode switching unit 74 is responsible for a mode switching function of switching the mode for numerical value setting using the slide bar 45 between the rough adjustment mode and the fine adjustment mode in accordance with the second gesture information from the second detection unit 71. The mode switching unit 74 outputs information about the mode (hereinafter referred to as "mode information") to the numerical value change unit 73 and to the display control unit 69.

The 3D image editing unit 75 edits the 3D image 40 from the 3D image obtaining unit 66 in accordance with the position information from the third detection unit 72. More specifically, the 3D image editing unit 75 performs a rotation process and an enlarging/reducing process for the 3D image 40 so that the 3D image 40 is in an orientation and size when viewed from the position of the HMD 11 indicated by the position information. The position information is output for each of the users 14A to 14C. The 3D image editing unit 75 edits the 3D image 40 so as to correspond to each of the users 14A to 14C on the basis of the position information of each of the users 14A to 14C. The 3D image editing unit 75 outputs the edited 3D image 40 to the display control unit 69.

Note that, similarly to the detection unit 67, the processing unit 68 also has a processing unit that performs various processes corresponding to gestures other than the first gesture and the second gesture.

The display control unit 69 is responsible for a display control function of controlling display of a virtual image, namely, the 3D image 40, which is a virtual object, and the slide bar 45, which is a virtual UI, on the HMD 11. The display control unit 69 outputs the 3D image 40 passed from the 3D image editing unit 75 to the HMD 11. The display control unit 69 outputs the slide bar 45 read from the storage device 50 to the HMD 11.

Figure 8:
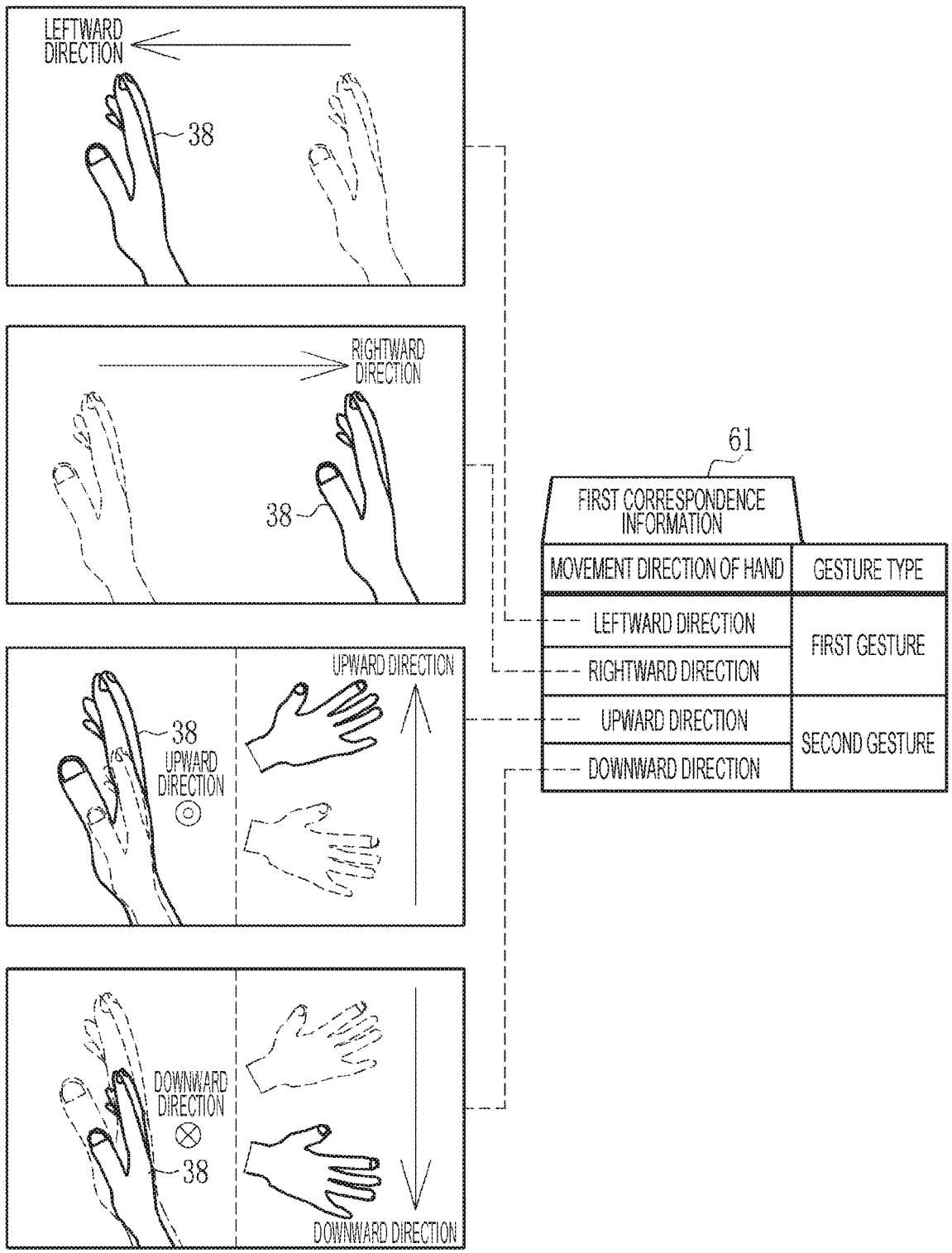
FIG. 8 is a diagram illustrating first correspondence information and gestures in respective directions using the hand of a user.

In FIG. 8, the first correspondence information 61 indicates correspondences between the movement direction of the hand 38 of the user 14 and the gesture type. Here, a case where the movement direction of the hand 38 is the leftward direction and a case where the movement direction of the hand 38 is the rightward direction correspond to the first gesture, and a case where the movement direction of the hand 38 is the upward direction and a case where the movement direction of the hand 38 is the downward direction correspond to the second gesture.

The four illustrations on the left side illustrate the locus of the hand 38 present in a captured image from the camera 29 in a case of movement in the respective directions, and the hand 38 before movement is represented by a dashed line and the hand 38 after movement is represented by a solid line. The four illustrations illustrate the case where the hand 38 is moved in the leftward direction, the case where the hand 38 is moved in the rightward direction, the case where the hand 38 is moved in the upward direction, and the case where the hand 38 is moved in the downward direction in this order from the top. The upward direction is a direction in which the user 14 puts the hand 38 from a downward side to an upward side, and the downward direction is a direction in which, to the contrary, the user 14 puts the hand 38 from an upward side to a downward side.

Here, the leftward direction and the rightward direction respectively correspond to a first direction and a second direction opposite to the first direction, and the upward direction and the downward direction respectively correspond to a third direction different from the first direction and a fourth direction different from the second direction and opposite to the third direction. A gesture in which the hand 38 is moved in the rightward direction and a gesture in which the hand 38 is moved in the leftward direction respectively correspond to a first-direction gesture and a second-direction gesture, and a gesture in which the hand 38 is moved in the upward direction and a gesture in which the hand 38 is moved in the downward direction respectively correspond to a third-direction gesture and a fourth-direction gesture.

In FIG. 9, the third correspondence information 63 indicates correspondences between the mode including the rough adjustment mode and the fine adjustment mode, the range of settable numerical values, and the unit change width for a numerical value. The unit change width is a change width for a numerical value relative to the unit movement amount of the hand 38. To the rough adjustment mode, the entire settable range (corresponding to a first range) is made to correspond as the range, and ±10 (corresponding to a first change width) is made to correspond as the unit change width. On the other hand, to the fine adjustment mode, one-fifth (corresponding to a second range) of the entire settable range is made to correspond as the range, and ±1 (corresponding to a second change width) is made to correspond as the unit change width.

Therefore, in a case where, for example, the entire settable range is a range of 0 to 100, the range of settable numerical values in the fine adjustment mode is a range that is one-fifth of the entire settable range and has a width of 20 and that includes a numerical value set in the rough adjustment mode as the median. For example, in a case where the entire settable range is a range of 0 to 100 and a numerical value set in the rough adjustment mode is 50, the range of settable numerical values in the fine adjustment mode is a range of 40 to 60. A numerical value changes by ±10 in the rough adjustment mode while a numerical value changes by ±1 in the fine adjustment mode relative to the same movement amount of the hand 38.

As illustrated in FIG. 10, in a case where the movement direction of the hand 38 indicated by the first gesture information from the first detection unit 70 is the leftward direction, the numerical value change unit 73 decreases the numerical value. To the contrary, in a case where the movement direction of the hand 38 is the rightward direction, the numerical value change unit 73 increases the numerical value, as illustrated in FIG. 11. The numerical value change unit 73 changes the numerical value on the basis of the unit change width corresponding to the mode in accordance with the movement amount of the hand 38 indicated by the first gesture information from the first detection unit 70. For example, in a case where the movement amount of the hand 38 is twice the unit movement amount in the fine adjustment mode, the numerical value is changed by ±2. Note that, in the initial stage of numerical value setting, the median of the entire settable range (for example, 50 in a case where the entire settable range is a range of 0 to 100) is set.

In a case where movement of the hand 38 in the right-left direction stops, as a matter of course, the first detection unit 70 does not detect the first gesture, and the numerical value change unit 73 does not change the numerical value accordingly. In the case where movement of the hand 38 in the right-left direction stops, the slider 47 moving on the bar 46 also stops.

Figure 13:
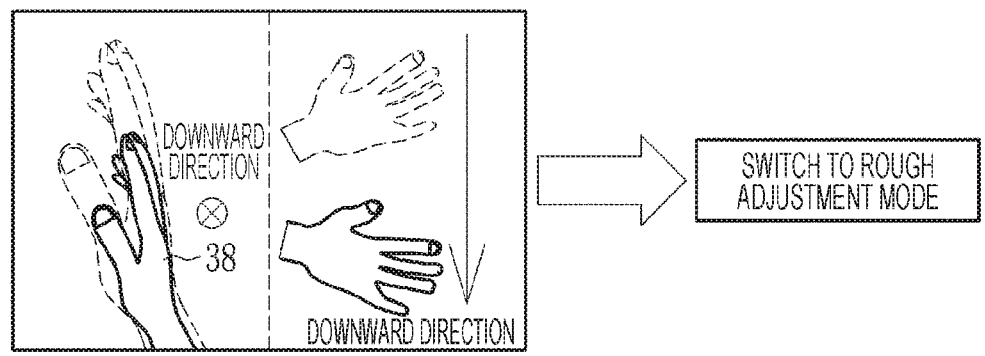
FIG. 13 is a diagram illustrating a relationship between a gesture and mode switching.

As illustrated in FIG. 12, in a case where the movement direction of the hand 38 indicated by the second gesture information from the second detection unit 71 is the upward direction and the mode before movement of the hand 38 is the rough adjustment mode, the mode switching unit 74 switches the mode to the fine adjustment mode. To the contrary, in a case where the movement direction of the hand 38 is the downward direction and the mode before movement of the hand 38 is the fine adjustment mode, the mode switching unit 74 switches the mode to the rough adjustment mode, as illustrated in FIG. 13. Note that, in the initial stage of numerical value setting, the rough adjustment mode is set.

Figure 14:
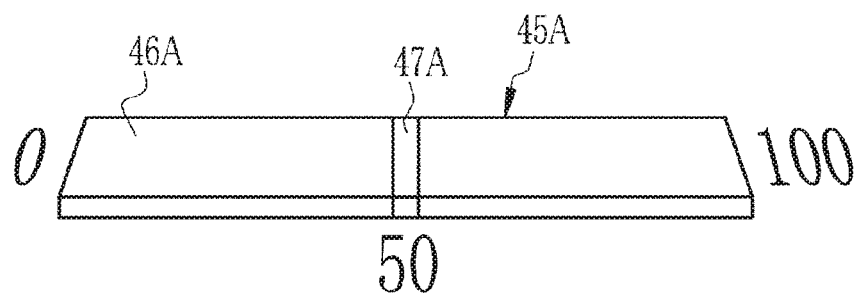
FIG. 14 is a diagram illustrating a rough adjustment slide bar.
Figure 15:
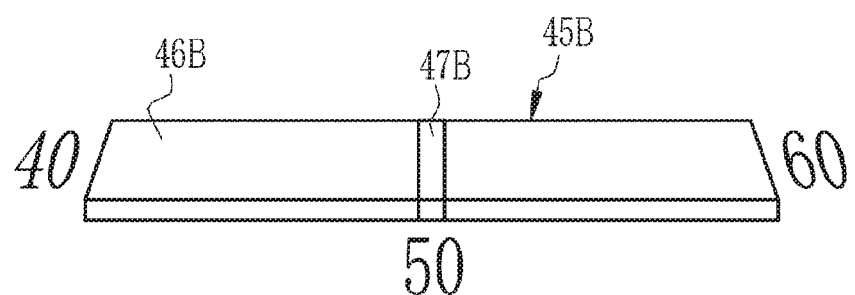
FIG. 15 is a diagram illustrating a fine adjustment slide bar.

In a case where, for example, the transmittance of a layer, such as the skin, is changed, the display control unit 69 causes two types of slide bars, namely, a rough adjustment slide bar 45A for the rough adjustment mode illustrated in FIG. 14 and a fine adjustment slide bar 45B for the fine adjustment mode illustrated in FIG. 15, to be displayed on the HMD 11. The rough adjustment slide bar 45A corresponds to a rough adjustment interface, and the fine adjustment slide bar 45B corresponds to a fine adjustment interface.

In FIG. 14, the rough adjustment slide bar 45A is the same as the slide bar 45 illustrated in FIG. 5 except that "A" is added to the reference numerals. The rough adjustment slide bar 45A is displayed on the HMD 11 in a case of the rough adjustment mode. The settable range represented by a bar 46A of the rough adjustment slide bar 45A is the entire settable range defined in the third correspondence information 63. Note that the example case where the transmittance of a layer, such as the skin, is changed is described here, and therefore, the entire settable range is a range of 0(%) to 100(%).

In FIG. 15, the basic structure of the fine adjustment slide bar 45B is the same as that of the rough adjustment slide bar 45A; however, the settable range represented by a bar 46B differs and is a range that is one-fifth (in this case, from 40 to 60) of the entire settable range defined in the third correspondence information 63. The fine adjustment slide bar 45B is displayed on the HMD 11 in a case of the fine adjustment mode.

Figure 16:
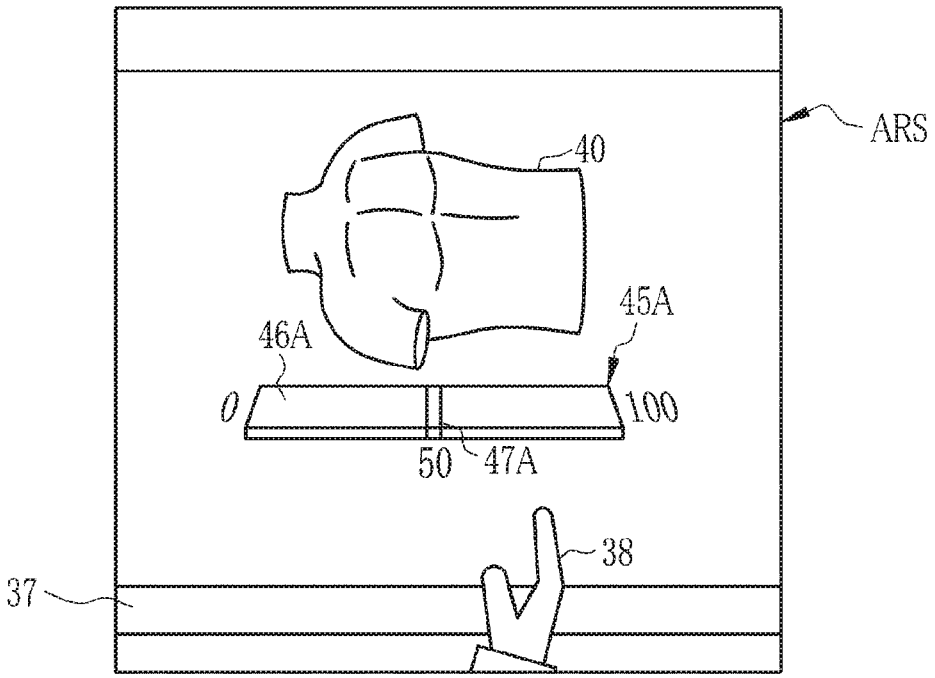
FIG. 16 is a diagram illustrating a state where the rough adjustment slide bar appears in an augmented reality space.
Figure 17:
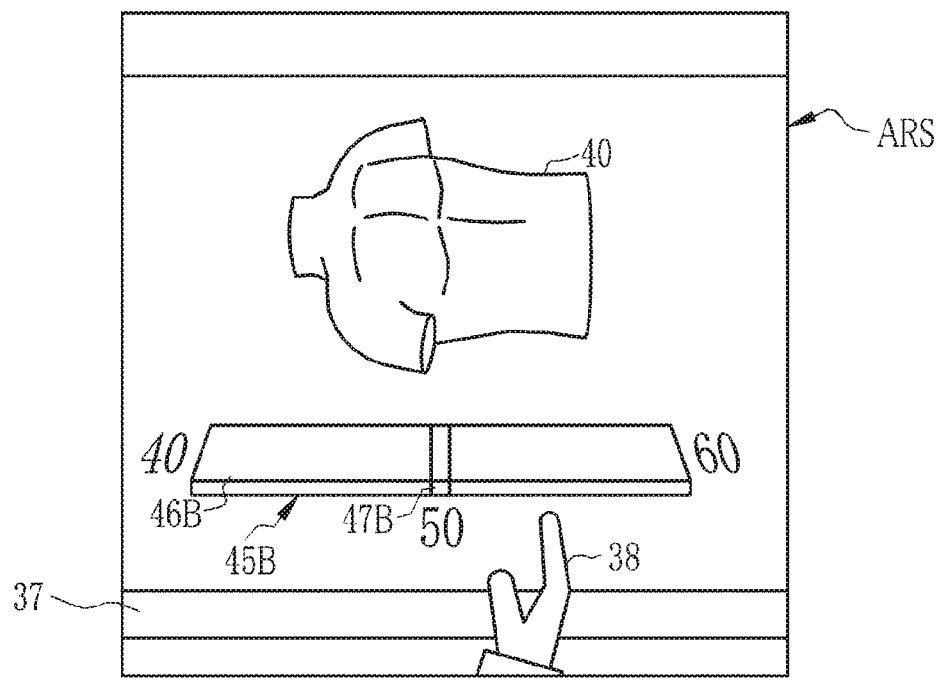
FIG. 17 is a diagram illustrating a state where the fine adjustment slide bar appears in an augmented reality space.
Figure 18:
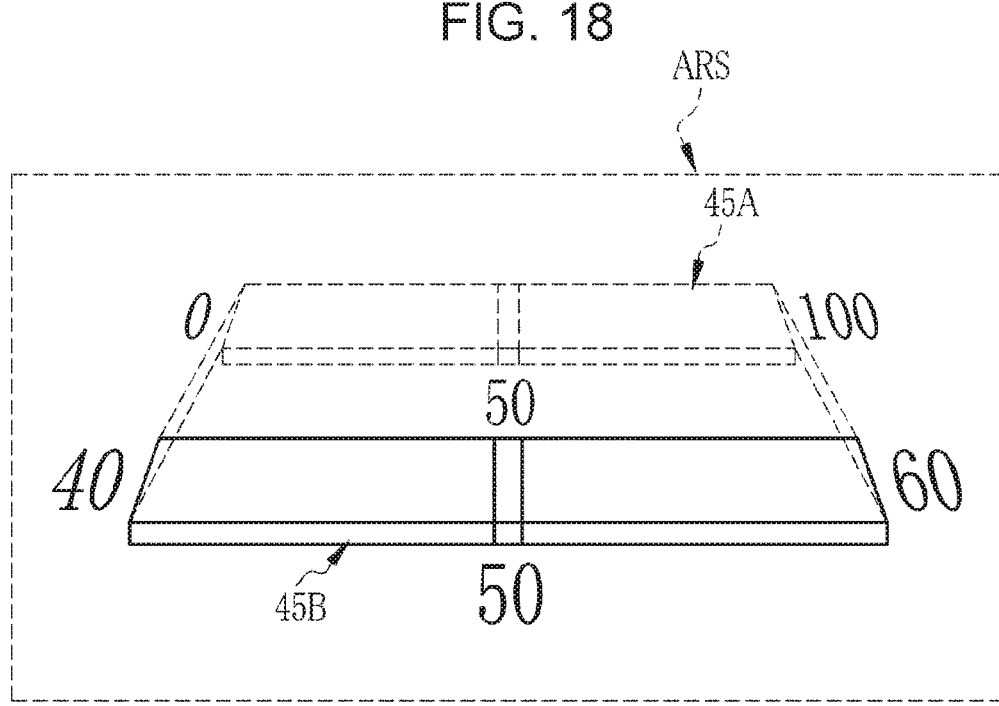
FIG. 18 is a diagram illustrating a relationship between the rough adjustment slide bar and the fine adjustment slide bar in terms of display position and size.

FIG. 16 illustrates a state where the rough adjustment slide bar 45A appears in the augmented reality space ARS in the rough adjustment mode. On the other hand, FIG. 17 illustrates a state where the fine adjustment slide bar 45B appears in the augmented reality space ARS in the fine adjustment mode. As illustrated, the display control unit 69 causes the rough adjustment slide bar 45A and the fine adjustment slide bar 45B to be selectively displayed on the HMD 11 in accordance with the mode information from the mode switching unit 74. As illustrated in FIG. 18, the display control unit 69 causes the fine adjustment slide bar 45B to be displayed in a larger size on a nearer side than the rough adjustment slide bar 45A (represented by a dashed line) in the augmented reality space ARS.

Figure 19:
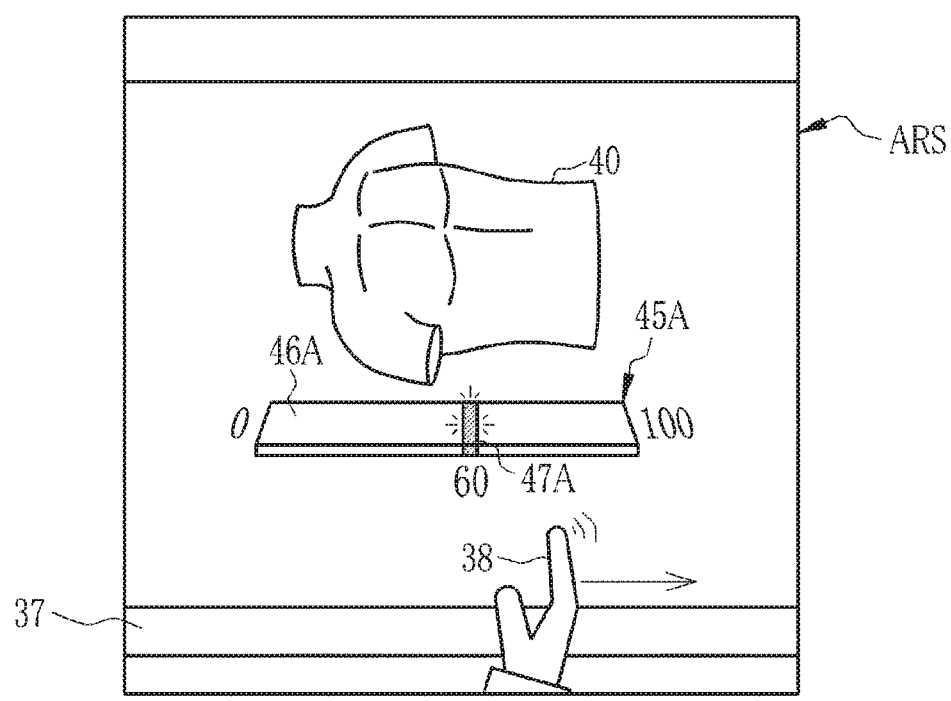
FIG. 19 is a diagram illustrating a state where a numerical value is set by using the rough adjustment slide bar.

FIG. 19 illustrates a state where a numerical value is being set by the user 14 using the rough adjustment slide bar 45A and moving the hand 38 in the rightward direction. In this case, the display control unit 69 changes the display position of a slider 47A in accordance with the numerical value information from the numerical value change unit 73. Here, the display control unit 69 changes the display position of the slider 47A in a state where the hand 38 of the user 14 is not in contact with the rough adjustment slide bar 45A. That is, the first detection unit 70 detects the first gesture in the state where the hand 38 of the user 14 is not in contact with the rough adjustment slide bar 45A in the augmented reality space ARS. The same applies to the case of the fine adjustment slide bar 45B.

In the augmented reality space ARS, the second detection unit 71 detects the second gesture illustrated in FIG. 12 and FIG. 13 in the state where the hand 38 of the user 14 is not in contact with the slide bar 45. Note that, to the contrary, the first detection unit 70 and the second detection unit 71 may respectively detect the first gesture and the second gesture only in a case where the hand 38 of the user 14 is located at a position such that the hand 38 of the user 14 is in contact with the slide bar 45.

Figure 20:
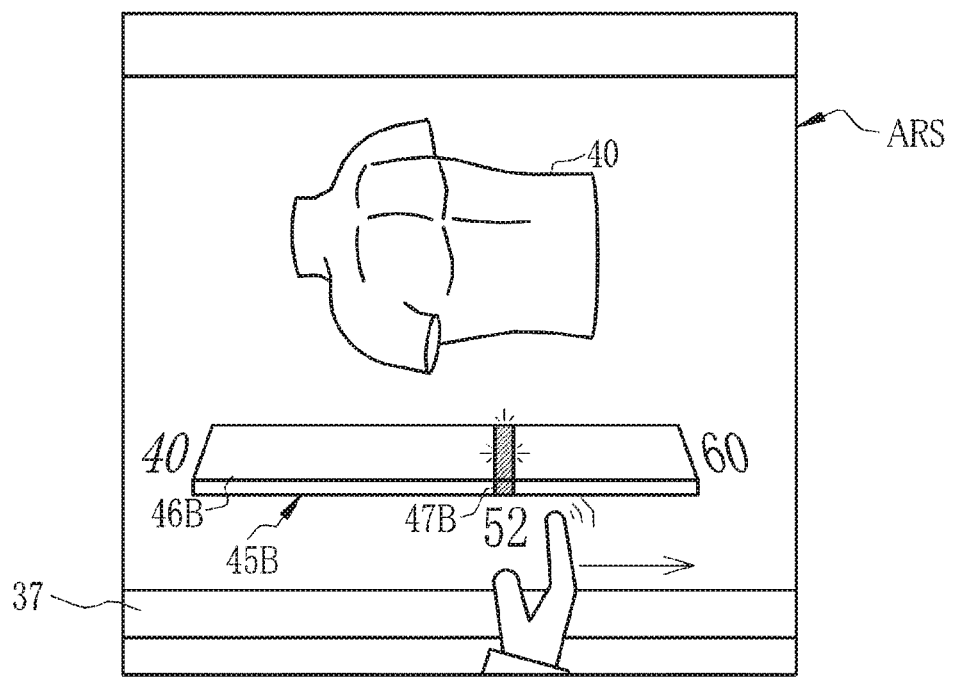
FIG. 20 is a diagram illustrating a state where a numerical value is set by using the fine adjustment slide bar.

The display control unit 69 colors the slider 47A differently, as represented by hatching, from a case where the first gesture is not detected (in a stop state). For example, the display control unit 69 colors the slider 47A blue in a case where the first gesture is not detected and colors the slider 47A orange in a case where the first gesture is detected (in a movement state). Accordingly, the display control unit 69 makes the display mode of the slider 47A differ in the case where the first gesture is detected and in the case where the first gesture is not detected. Note that FIG. 19 illustrates the example case of the rough adjustment slide bar 45A. Also in the case of the fine adjustment slide bar 45B, the display control unit 69 similarly changes the display position of a slider 47B in accordance with the numerical value information and makes the display mode of the slider 47B differ in the case where the first gesture is detected and in the case where the first gesture is not detected, as illustrated in FIG. 20. Note that, instead of or in addition to the method of making the color differ, the brightness of the slider 47 or the depth of the color of the slider 47 may be made to differ, or the slider 47 may be blinked in a movement state and the blinking may be stopped in a stop state.

In a case where the numerical value reaches the upper limit value or the lower limit value of the range on the fine adjustment slide bar 45B, and thereafter, the first gesture is further detected, the display control unit 69 changes display of the range of the bar 46B.

Figure 21:
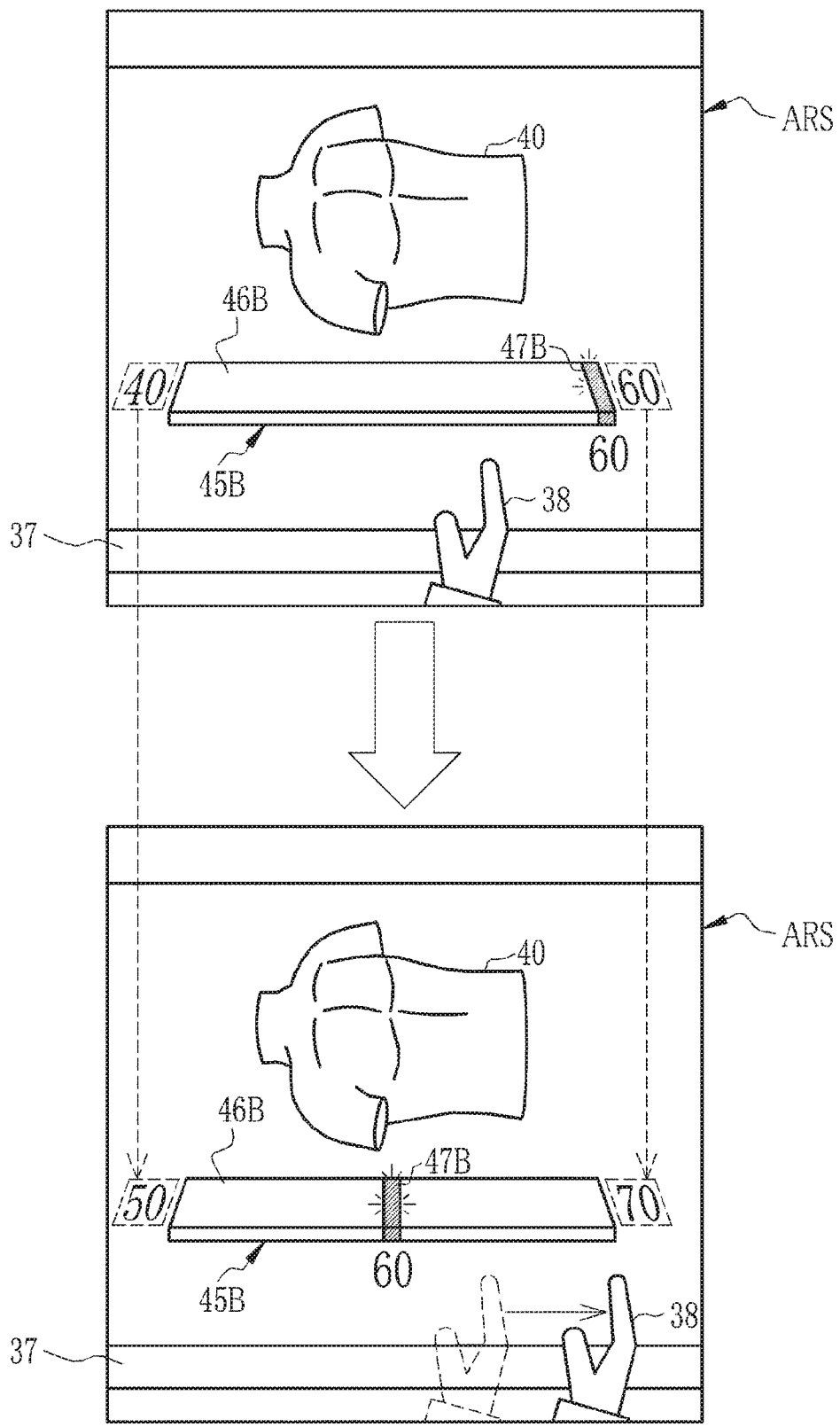
FIG. 21 is a diagram illustrating a state where, in a case where a numerical value reaches an upper limit value of the range on the fine adjustment slide bar, and thereafter, a first gesture is further detected, display of the range of the bar is changed.

More specifically, as illustrated in the upper part of FIG. 21, in a case where the user 14 moves the hand 38 in the rightward direction and sets a numerical value using the fine adjustment slide bar 45B, if the slider 47B reaches the position corresponding to "60", which is the upper limit value of the range, and the hand 38 is further moved in the rightward direction, as illustrated in the lower part of FIG. 21, the display control unit 69 changes display of the range of the bar 46B from "40 to 60" to "50 to 70". On the other hand, as illustrated in the upper part of FIG. 22, in a case where the user 14 moves the hand 38 in the leftward direction and sets a numerical value using the fine adjustment slide bar 45B, if the slider 47B reaches the position corresponding to "40", which is the lower limit value of the range, and the hand 38 is further moved in the leftward direction, as illustrated in the lower part of FIG. 22, the display control unit 69 changes display of the range of the bar 46B from "40 to 60" to "30 to 50".

Hereinafter, operations performed in accordance with the above-described configuration are described with reference to the flowcharts in FIG. 23 and FIG. 24. First, the users 14A to 14C gather together in the operating room 35 to hold a conference and respectively put the HMDs 11A to 11C on their head. Then, one of the users 14A to 14C lays the marker 39 on the operation table 37 at a desired position. Next, the user 14 operates the input device 16 of the control apparatus 12 to transmit, to the image accumulation server 19, a distribution request for the 3D image 40 of the target patient. Accordingly, the 3D image 40 of the target patient is distributed to the control apparatus 12 from the image accumulation server 19.

Figure 23:
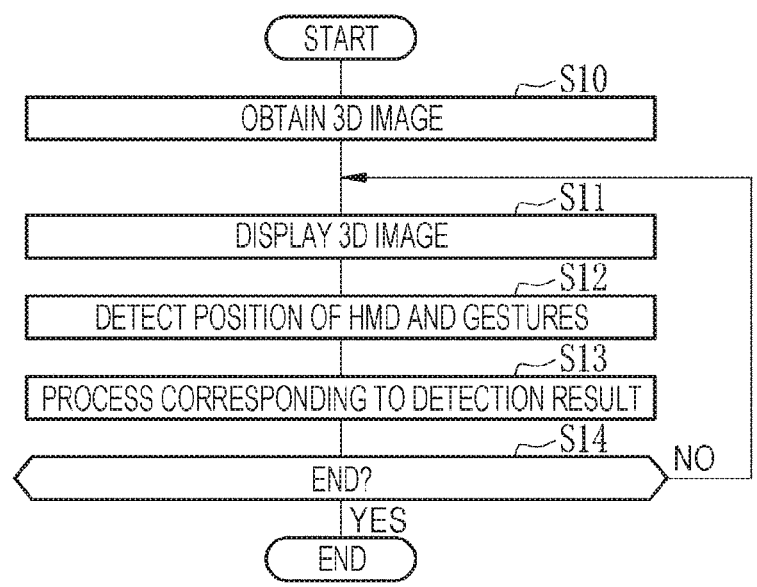
FIG. 23 is a flowchart illustrating an overall processing procedure of a conference held by using the image display system.

As illustrated in FIG. 23, in the control apparatus 12, the 3D image 40 of the target patient is obtained by the 3D image obtaining unit 66 (step S10). The 3D image 40 is displayed on the HMD 11 via the display control unit 69 (step S11).

For example, the users 14 come close to the 3D image 40 to grasp the details of an affected part or move away from the 3D image 40 to grasp the overall picture, or the users 14 change the orientation of their face or their standing position to observe the affected part at different angles. One of the users 14 performs various processes on the 3D image 40 by making gestures using the hand 38.

In the control apparatus 12, the position of the HMD 11 and gestures are detected by the detection unit 67 on the basis of captured images from the camera 29 obtained by the captured-image obtaining unit 65 (step S12). Then, a process corresponding to the detection result is performed by the processing unit 68 (step S13). For example, the three-dimensional position of the HMD 11 relative to the marker 39 is detected by the third detection unit 72, and the 3D image 40 is edited by the 3D image editing unit 75 in accordance with the detection result, which is the position information.

These processes from steps S11 to S13 are repeatedly performed until an instruction for ending the conference is input via the input device 16 (YES in step S14).

Figure 24:
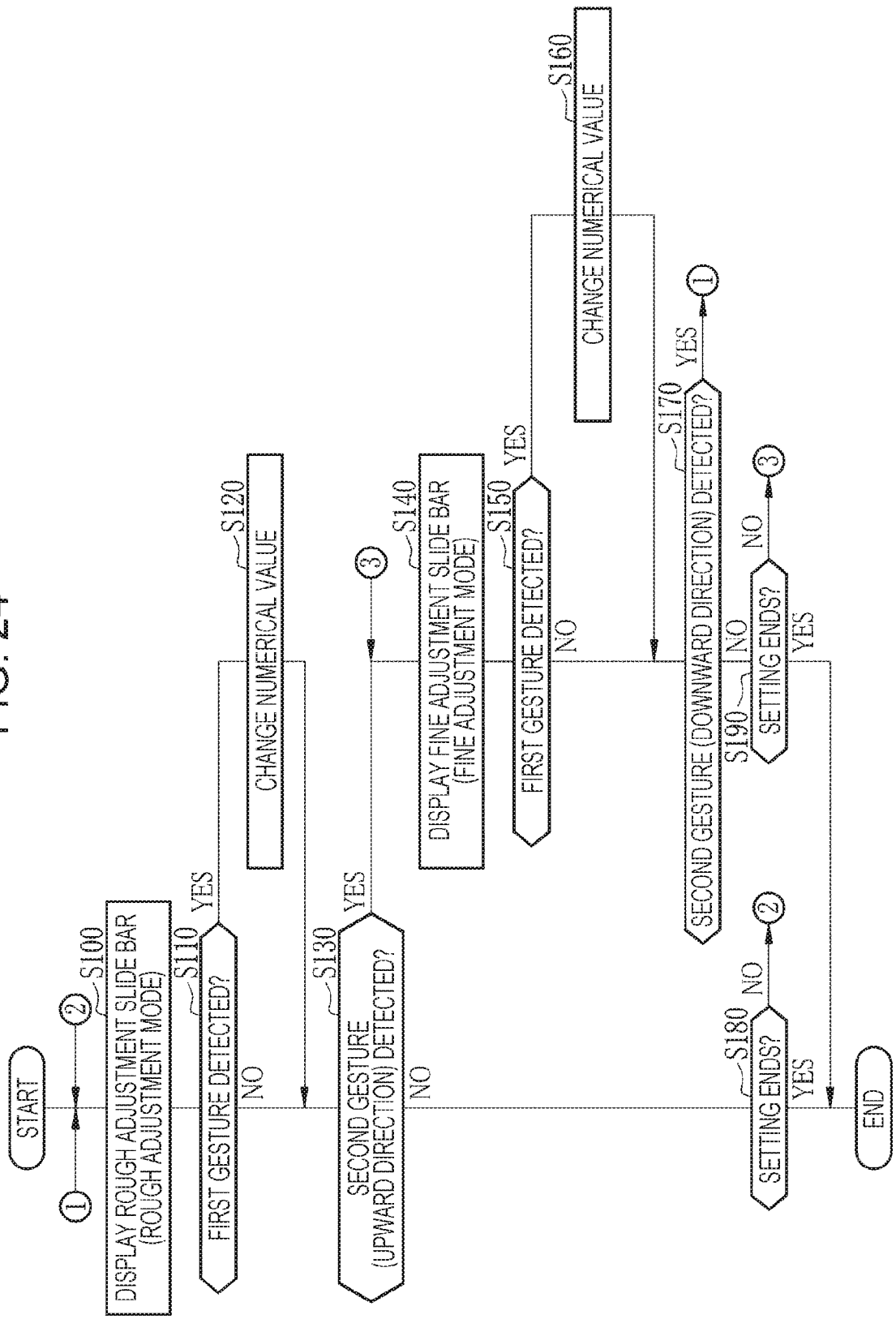
FIG. 24 is a flowchart illustrating a processing procedure in a case of setting a numerical value using slide bars.

The flowchart in FIG. 24 illustrates a processing procedure that is performed in a case of setting a numerical value using the slide bar 45. First, in step S100, the rough adjustment slide bar 45A is displayed on the HMD 11 by the display control unit 69 (display control step). The user 14 makes a gesture using the hand 38 within the field of view of the camera 29 to set a desired numerical value.

If the first gesture, as illustrated in FIG. 10 or FIG. 11, is detected by the first detection unit 70 in a state where the rough adjustment slide bar 45A is displayed on the HMD 11 as illustrated in FIG. 16 (YES in step S110, first detection step), the first gesture information is output to the numerical value change unit 73. The numerical value change unit 73 changes the numerical value on the rough adjustment slide bar 45A in accordance with the first gesture information (step S120, numerical value change step). The display position of the slider 47A is changed by the display control unit 69 in accordance with the numerical value information from the numerical value change unit 73.

If the second gesture in which the hand 38 is moved in the upward direction, as illustrated in FIG. 12, is detected by the second detection unit 71 in the state where the rough adjustment slide bar 45A is displayed on the HMD 11 as illustrated in FIG. 16 (YES in step S130, second detection step), the second gesture information is output to the mode switching unit 74. Then, the mode information for switching the mode from the rough adjustment mode to the fine adjustment mode is output from the mode switching unit 74 to the display control unit 69. Accordingly, the fine adjustment slide bar 45B is displayed on the HMD 11 in place of the rough adjustment slide bar 45A, as illustrated in FIG. 17 (step S140, mode switching step, display control step).

If the first gesture, as illustrated in FIG. 10 or FIG. 11, is detected by the first detection unit 70 in a state where the fine adjustment slide bar 45B is displayed on the HMD 11 as illustrated in FIG. 17 (YES in step S150, first detection step), the numerical value on the fine adjustment slide bar 45B is changed similarly to step S120 (step S160, numerical value change step). The display position of the slider 47B is changed by the display control unit 69 in accordance with the numerical value information from the numerical value change unit 73.

If the second gesture in which the hand 38 is moved in the downward direction, as illustrated in FIG. 13, is detected by the second detection unit 71 in the state where the fine adjustment slide bar 45B is displayed on the HMD 11 as illustrated in FIG. 17 (YES in step S170, second detection step), the second gesture information is output to the mode switching unit 74. Then, the mode information for switching the mode from the fine adjustment mode to the rough adjustment mode is output from the mode switching unit 74 to the display control unit 69. Accordingly, the rough adjustment slide bar 45A is redisplayed on the HMD 11 in place of the fine adjustment slide bar 45B, as illustrated in FIG. 16 (step S100, mode switching step, display control step).

Figure 22:
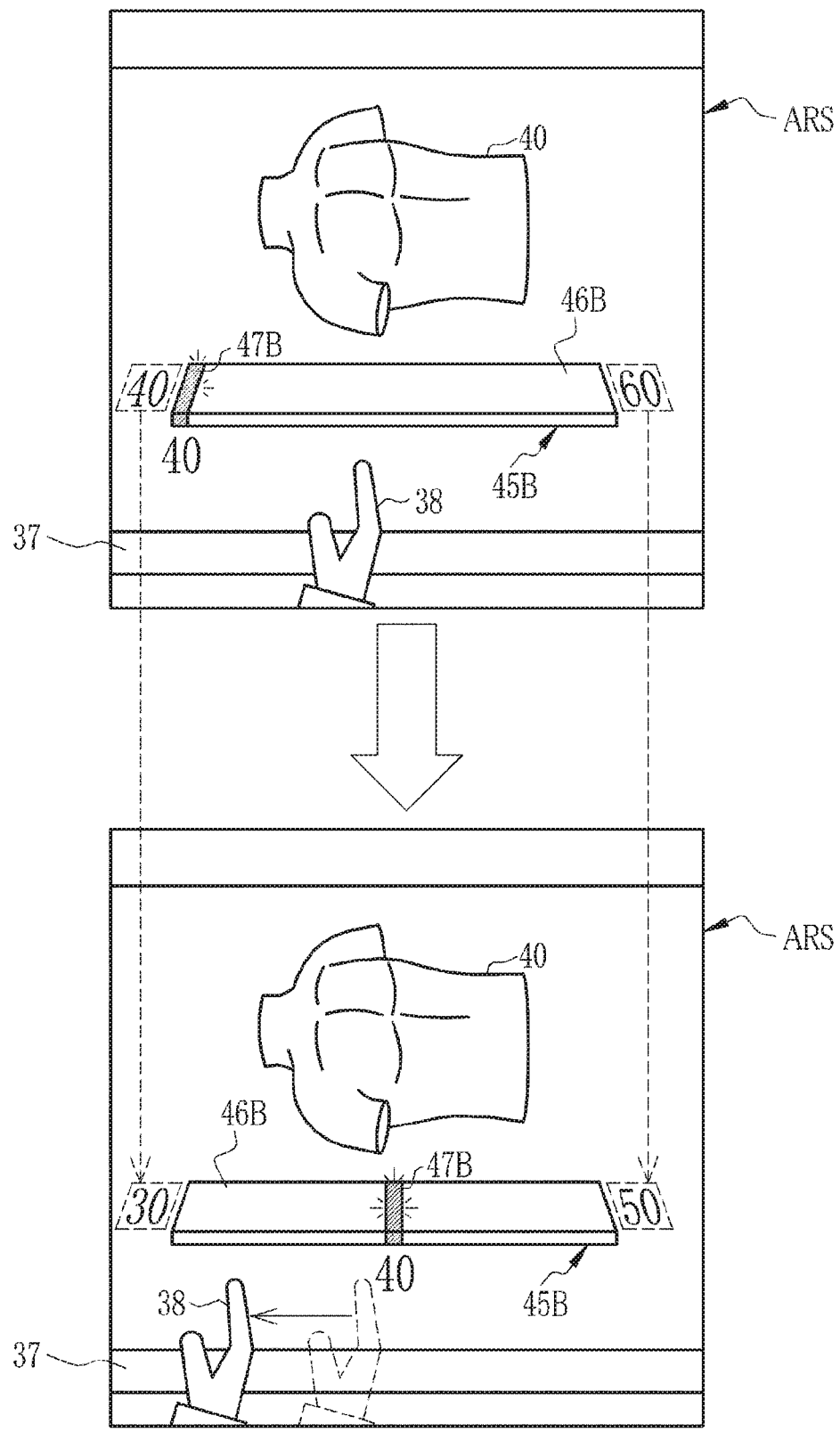
FIG. 22 is a diagram illustrating a state where, in a case where a numerical value reaches a lower limit value of the range on the fine adjustment slide bar, and thereafter, a first gesture is further detected, display of the range of the bar is changed.

Here, as illustrated in FIG. 21 or FIG. 22, in a case where the user 14 moves the hand 38 in the rightward direction or in the leftward direction to set a numerical value using the fine adjustment slide bar 45B, if the slider 47B reaches the position corresponding to the upper limit value or the lower limit value of the range and the hand 38 is further moved in the rightward direction or in the leftward direction, display of the range of the bar 46B is changed.

This series of processes is repeatedly performed until an instruction for ending numerical value setting is given from the user 14 (YES in step S180 or YES in step S190). Note that the instruction for ending numerical value setting is given by making a gesture different from the first gesture and the second gesture, the gesture being such that, for example, forming a circle with the thumb and the index finger.

Switching is performed between the rough adjustment mode in which the settable range is the first range or/and the unit change width for a numerical value is the first change width and the fine adjustment mode in which the range is the second range narrower than the first range or/and the unit change width is the second change width narrower than the first change width. Therefore, the user 14 can roughly set a numerical value close to a desired numerical value in the rough adjustment mode, and thereafter, switch to the fine adjustment mode to finely set the desired numerical value. Accordingly, setting of a numerical value using the slide bar 45, which is a virtual UI, can be performed quickly and accurately.

The slide bar 45, which is a virtual UI, has a problem in that the user has difficulty in having an operational feel in terms of the sense of touch and has difficulty in performing a delicate operation. Accordingly, the effect of the present invention in which setting of a numerical value can be performed quickly and accurately is very significant compared to the case of a non-virtual UI.

The first gesture for setting a numerical value is a gesture in which the hand 38 is moved in the leftward direction and in the rightward direction, and the second gesture for switching the mode is a gesture in which the hand 38 is moved in the upward direction and in the downward direction. Therefore, the gestures are simple, and the directions, namely, the right-left direction and the up-down direction, are orthogonal to each other and different from each other. Accordingly, the first gesture is not confused with the second gesture.

The direction in the first gesture and the movement direction of the slider 47 are the right-left direction and match. Movement of the hand 38 in the upward direction is made to correspond to switching to the fine adjustment mode in which the settable range is narrowed, and movement of the hand 38 in the downward direction is made to correspond to the rough adjustment mode in which the settable range is widened. Therefore, the user 14 can perform operations intuitively.

The rough adjustment slide bar 45A is displayed on the HMD 11 in the rough adjustment mode and the fine adjustment slide bar 45B is displayed on the HMD 11 in the fine adjustment mode in a selective manner, and therefore, the user 14 can immediately know which mode is the current mode when viewing the displayed slide bar 45. Further, the fine adjustment slide bar 45B is displayed in a larger size on a nearer side than the rough adjustment slide bar 45A in the augmented reality space ARS, and therefore, the user 14 can know that the current mode is the fine adjustment mode more clearly. Display switching from the rough adjustment slide bar 45A to the fine adjustment slide bar 45B is easily known visually.

As illustrated in FIG. 21 and FIG. 22, in the case where the numerical value reaches the upper limit value or the lower limit value of the range on the fine adjustment slide bar 45B, and thereafter, the first gesture is further detected, the display control unit 69 changes display of the range of the bar 46B. Therefore, in a case where the desired numerical value is a numerical value close to the upper limit value or the lower limit value, the user 14 need not take the trouble to switch the mode back to the rough adjustment mode and reset the numerical value using the rough adjustment slide bar 45A and can complete setting of the numerical value by using the fine adjustment slide bar 45B.

The display mode of the slider 47 is made to differ in the case where the first gesture is detected (in a movement state) and in the case where the first gesture is not detected (in a stop state), and therefore, the user 14 can determine whether the numerical value is being set on the basis of the display mode of the slider 47.

Note that both the range of settable numerical values and the unit change width for a numerical value are changed in the modes; however, at least one of the range or the unit change width may be changed in the modes. Specifically, the change width may be set to the same width of ±1 and the range may be changed in the modes. Alternatively, the range may be set to the same range, namely, the entire settable range, and the change width may be changed in the modes.

As illustrated in FIG. 19 and so on, the first gesture and the second gesture are respectively detected by the first detection unit 70 and the second detection unit 71 in the state where the hand 38 of the user 14 is not in contact with the slide bar 45, which produces an effect in which a disadvantage of the virtual UI, that is, no sensation of actual touching, is offset.

For operating the slide bar 45, a delicate operation is needed. Therefore, if a form is employed in which the first gesture and the second gesture are detected only in the case where the hand 38 of the user 14 is located at a position such that the hand 38 of the user 14 is in contact with the slide bar 45, the user 14 conversely tends to have difficulty in operations and feel dissatisfied because of an uneasy feeling evoked by the absence of a sensation of actual touching with the hand. However, the first gesture and the second gesture are intentionally detected even in the state where the hand 38 of the user 14 is not in contact with the slide bar 45 to allow operations, thereby solving the psychological problem that the user 14 feels dissatisfied.

However, even in a case of allowing operations of the virtual UI in the state where the hand 38 of the user 14 is not in contact with the slide bar 45, a concern still remains over the user 14's dissatisfaction that an operation performed in the state where the hand is not in contact with the slide bar 45 is not intuitive.

For example, a form is assumed in which a switch button for switching between the rough adjustment mode and the fine adjustment mode and a pointer that moves in synchronization with movement of the hand 38 are displayed in the virtual space VS, the pointer is moved to the switch button by moving the hand 38, and the switch button is selected to thereby switch the mode. In this form, the user 14 may feel it difficult to match the movement of the hand 38 and the operation of the pointer in the user 14's head. This is because the movement of the hand 38 is movement in a three-dimensional space in which no restrictions are imposed but the movement of the pointer is two-dimensional movement in the virtual space VS, and the movement of the hand 38 and the movement of the pointer do not have a matching relationship, such as a relationship between two-dimensional movement of a mouse on a desk and movement of a pointer on a screen for a typical personal computer. The user 14 may have difficulty in accurately sensing, in their head, three-dimensional movement of the hand 38 as two-dimensional movement. Therefore, the operation of moving the pointer to the switch button itself is troublesome, and the user 14 may feel dissatisfied. This is a problem that may arise even in a case where the switch button is located at a position within reach of the hand 38 of the user 14 as long as the operation method in which the movement of the hand 38 is in synchronization with the movement of the pointer is used. Further, depending on the user 14's situation in which, for example, the user 14 is unable to move the hand 38 widely, there may be a problem that it is difficult to perform the operation of moving the pointer to the switch button.

Such a troublesome operation and difficulty in operations are more noticeable in a case where the switch button is located at a position that is out of reach of the hand 38 of the user 14. This is because a sensation felt with the hand 38 tends to be deviated from the felt movement of the pointer that is in synchronization with the hand 38 more often as the operation is an operation for a more remote place from the hand 38. The form of this remote operation will be described in detail in a second embodiment.

To the contrary, in this embodiment, the mode can be switched easily with the predetermined relatively simple second gesture in which the hand 38 is moved in the up-down direction. Regarding the first gesture, the slide bar 45 can be operated with the predetermined operation, which is simple compared to the case of operation using the pointer. Therefore, even in the case of allowing operations in the state where the hand 38 of the user 14 is not in contact with the slide bar 45, it is regarded that an intuitive operation is attained.

Second Embodiment

In the first embodiment described above, the description has been given under the assumption that the display position of the slide bar 45 in the virtual space VS is fixed; however, the display position in the real space RS may be fixed similarly to the 3D image 40.

Figure 25:
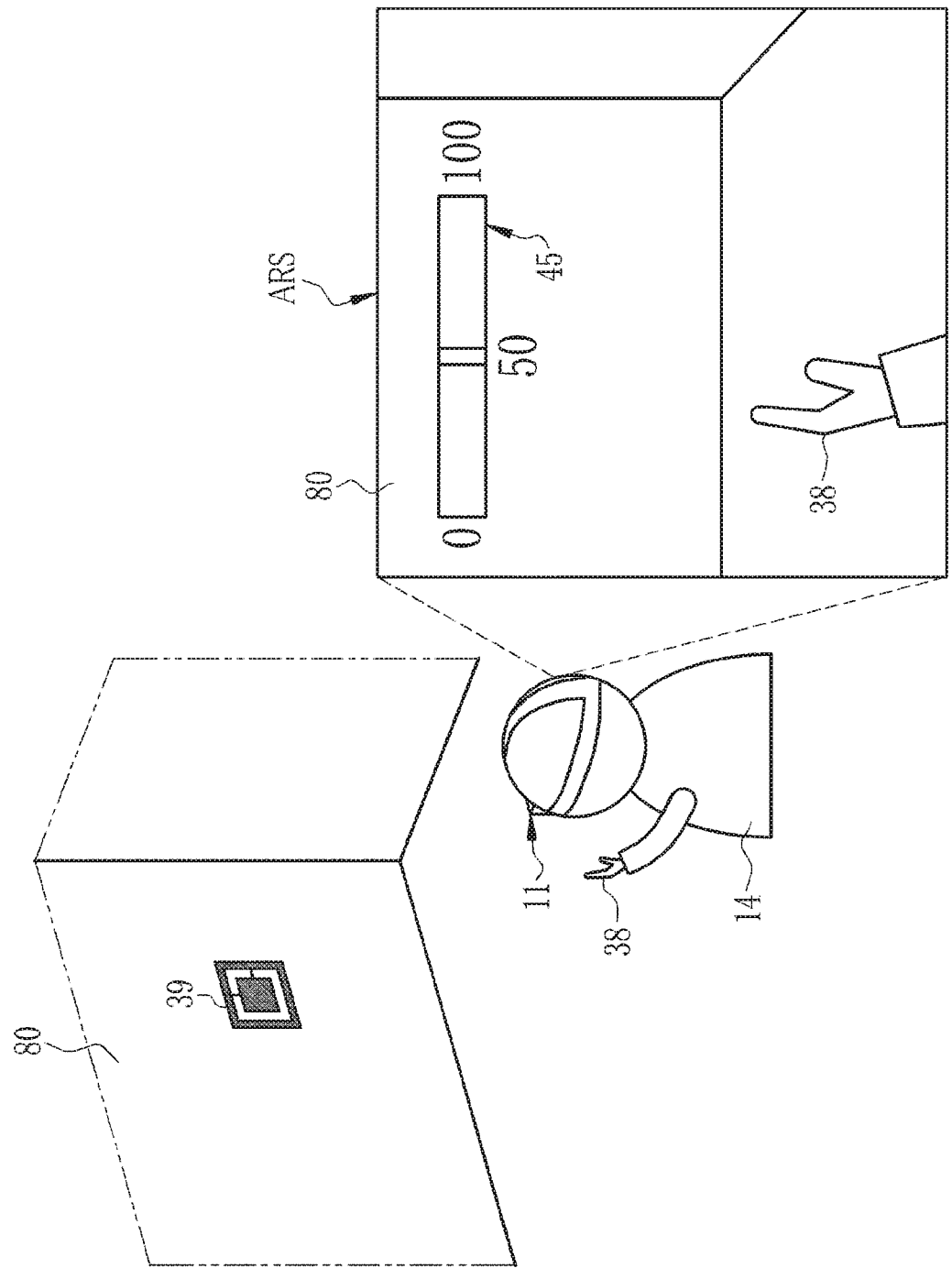
FIG. 25 is a diagram illustrating an example in which a slide bar is displayed at a remote position that is out of reach of the hand of a user.

FIG. 25 illustrates a state where the marker 39 is put on a wall 80, the slide bar 45 is made to appear on the wall 80, and the user 14 makes a gesture using the hand 38 for the slide bar 45 displayed on the wall 80. Accordingly, the slide bar 45 can be displayed at a place desirable to the user 14, and the slide bar 45 can be displayed at a remote position, such as the wall 80, that is physically out of reach of the hand 38 of the user 14 in the augmented reality space ARS.

The state where the hand 38 does not reach the slide bar 45 is intentionally created, which produces an effect in which a disadvantage of the virtual UI, that is, no sensation of actual touching, is offset. For operating the slide bar 45, a delicate operation is needed. Therefore, in the case where the slide bar 45 is located at a position within reach of the hand 38, the user 14 tends to feel dissatisfied because of the absence of a sensation of actual touching. However, when the state where the hand 38 does not reach the slide bar 45 is intentionally created, the psychological problem that the user 14 feels dissatisfied can be solved.

The remote position that is out of reach of the hand 38 needs to be a position distant by, for example, the average length of the arms of adult men set in advance or more, and includes the position in a case where the slide bar 45 is displayed in a state where a fixed distance from the user 14 is maintained so that the hand 38 does not reach the slide bar 45.

Meanwhile, in the case where the slide bar 45 is displayed at the remote position that is out of reach of the hand 38 of the user 14 in the augmented reality space ARS, as illustrated in the example in FIG. 25, the user may have more difficulty in having an operational feel and may have more difficulty in performing a delicate operation than in a case where the slide bar 45 is located at a near position within reach of the hand 38 of the user 14. For example, in a case where the display position of the slide bar 45 in the real space RS is fixed and control is performed so that the position of the bar 46 matches the position of the hand 38, as the user 14 is distant from the display position of the slide bar 45, the slide bar 45 becomes smaller, and the bar 46 moves to a larger degree even with small movement of the hand 38, which makes operations difficult. Therefore, when the present invention is applied to the case where the slide bar 45 is displayed at a remote position that is out of reach of the hand 38 of the user 14 in the augmented reality space ARS, the present invention is more effective in enabling quick and accurate numerical value setting.

Third Embodiment

In the first embodiment described above, the numerical value is changed in accordance with the movement amount of the hand 38. Therefore, depending on the difference between the currently set numerical value and a numerical value that the user 14 wants to set or the setting of the change width of a numerical value relative to the unit movement amount of the hand 38, the user 14 may need to move the hand 38 relatively widely. In this case, if the user 14 is in a situation where the user 14 is unable to move the hand 38 widely, numerical value setting may become difficult. Above all, the user 14 may be tired when the user 14 moves the hand 38 widely. Accordingly, in a third embodiment illustrated in FIG. 26 and FIG. 27, numerical value setting can be performed with a small movement amount of the hand 38.

Figure 26:
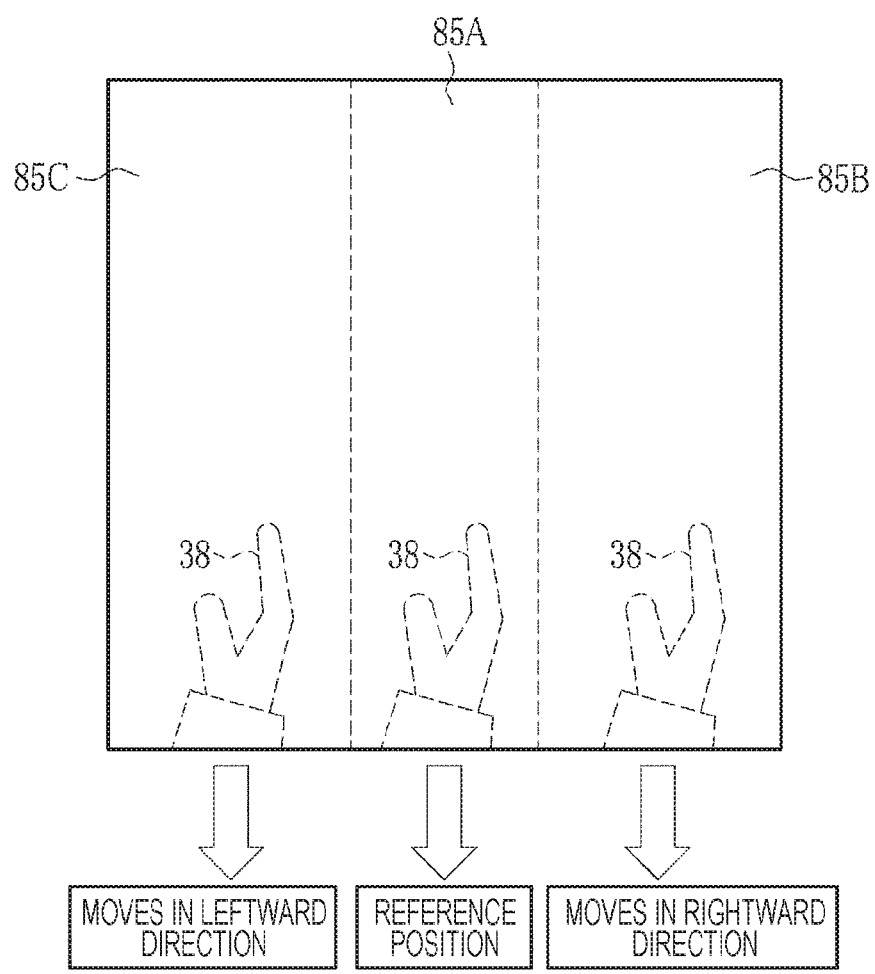
FIG. 26 is a diagram illustrating relationships between areas of a captured image from a camera and detection results obtained by a first detection unit.

In the third embodiment, a captured image from the camera 29 is substantially equally divided into three areas 85A, 85B, and 85C vertically, as illustrated in FIG. 26. In a case where the hand 38 is located in the center area, namely, the area 85A, the first detection unit 70 determines that the hand 38 is located at a reference position. The first detection unit 70 detects the direction in which the hand 38 moves from the reference position. Specifically, in a case where the hand 38 is located in the right-side area, namely, the area 85B, the first detection unit 70 determines that the hand 38 moves in the rightward direction from the reference position. In a case where the hand 38 is located in the left-side area, namely, the area 85C, the first detection unit 70 determines that the hand 38 moves in the leftward direction from the reference position.

The numerical value change unit 73 automatically changes the numerical value from when movement of the hand 38 in one direction, namely, the rightward direction or the leftward direction, is detected by the first detection unit 70 until when a return of the hand 38 to the reference position is detected by the first detection unit 70. The display control unit 69 automatically changes the display position of the slider 47 in accordance with the numerical value information from the numerical value change unit 73.

Figure 27:
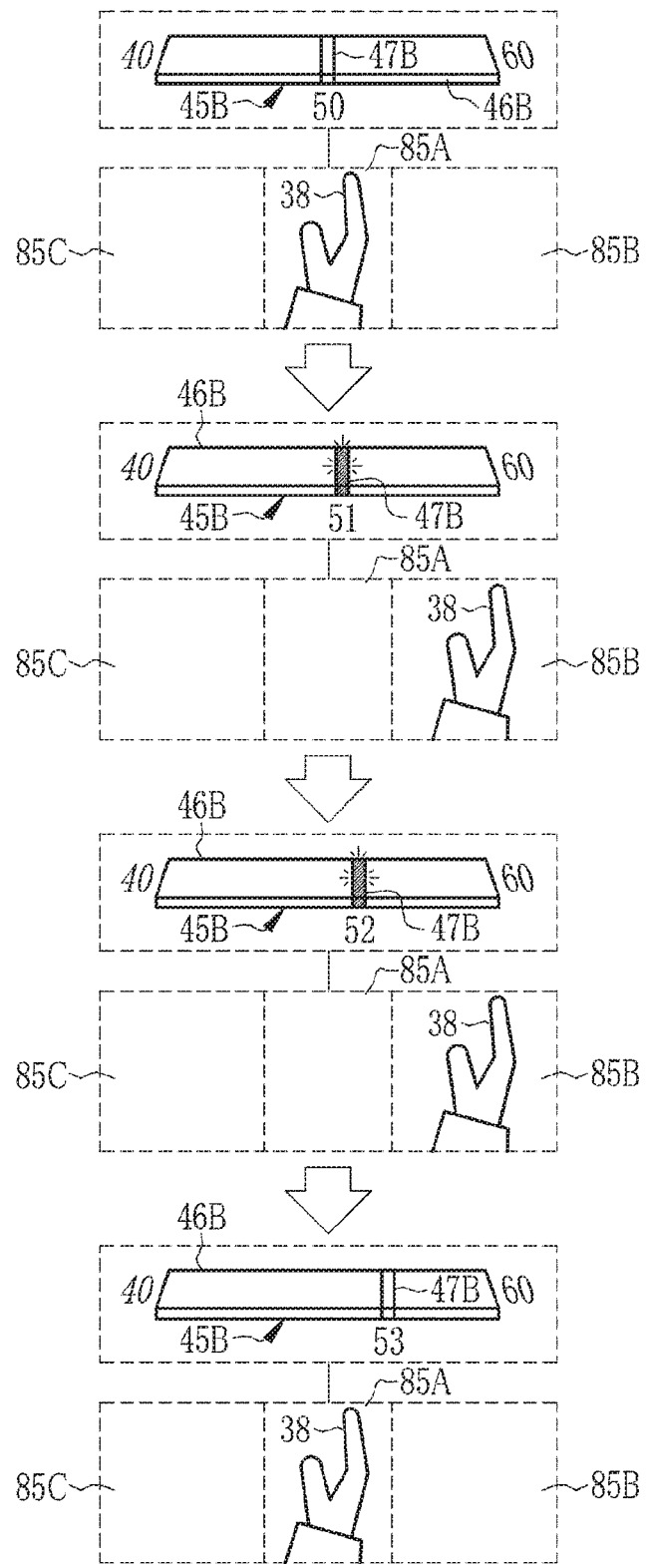
FIG. 27 is a diagram illustrating a state of numerical value setting according to a third embodiment.

FIG. 27 illustrates changes in the display position of the slider 47B of the fine adjustment slide bar 45B in a case where the one direction is the rightward direction. The top illustration illustrates an initial state where the hand 38 is located in the area 85A, namely, the reference position, and the slider 47B points "50". In a case where the hand 38 moves to the area 85B, as illustrated in the second illustration, from the state illustrated in the top illustration, it is determined by the first detection unit 70 that the hand 38 moves in the rightward direction from the reference position. Then, the numerical value is automatically changed by the numerical value change unit 73 on the basis of the unit change width defined in the third correspondence information 63. The slider 47B is automatically moved by the display control unit 69 from the position corresponding to "50" to the position corresponding to "51".

In the third illustration, the hand 38 still remains in the area 85B. Therefore, the numerical value is automatically changed by the numerical value change unit 73 continuously, and the slider 47B is further automatically moved to the position corresponding to "52" from the position corresponding to "51". Note that, in a movement state, the slider 47B is colored differently from the case of a stop state, as represented by hatching, similarly to the first embodiment described above.

The bottom illustration illustrates a state where the hand 38 returns to the reference position. In this case, it is determined by the first detection unit 70 that the hand 38 returns to the reference position. Then, the automatic change in the numerical value is stopped by the numerical value change unit 73. The slider 47B is stopped at the position corresponding to "53" by the display control unit 69. Note that, although not illustrated, also in a case where the one direction is the leftward direction and in a case where the slide bar 45 is the rough adjustment slide bar 45A, the numerical value is changed similarly as illustrated in FIG. 27.

As described above, the presence of the hand 38 at the reference position and the direction in which the hand 38 moves from the reference position are detected by the first detection unit 70, and the numerical value is automatically changed by the numerical value change unit 73 from when movement of the hand 38 in one direction, namely, the rightward direction or the leftward direction, is detected until when a return of the hand 38 to the reference position is detected. Therefore, numerical value setting can be performed with a small movement amount of the hand 38. Accordingly, it is possible to handle a situation where the user 14 is unable to move the hand 38 widely, and the user 14 can perform operations without feeling tired. Note that the reference position may be set in advance or may be set by the user 14.

Fourth Embodiment

In the first embodiment described above, the rough adjustment slide bar 45A and the fine adjustment slide bar 45B are selectively displayed; however, in a fourth embodiment illustrated in FIG. 28 to FIG. 32, both the rough adjustment slide bar 45A and the fine adjustment slide bar 45B are simultaneously displayed.

Figure 28:
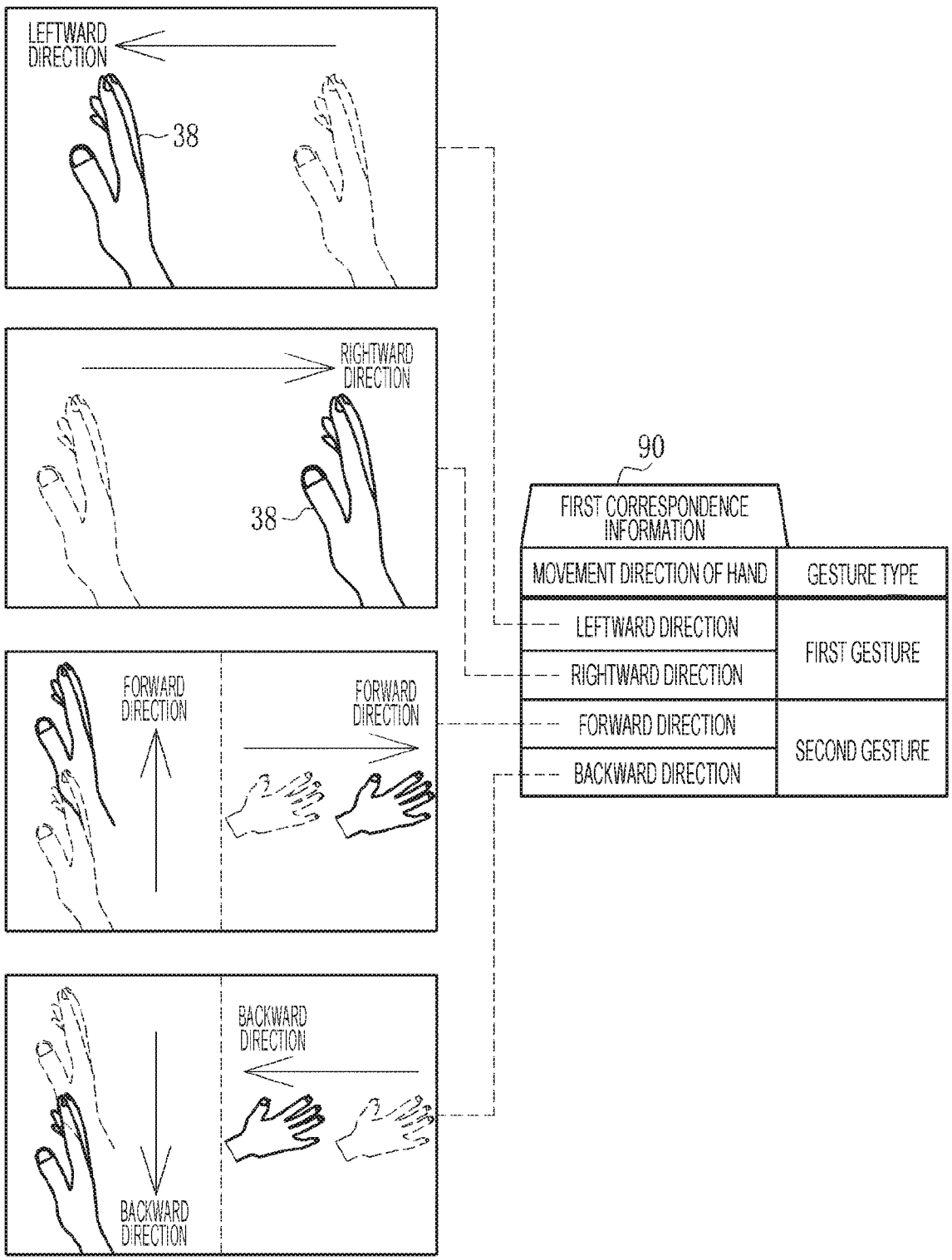
FIG. 28 is a diagram illustrating first correspondence information and gestures in respective directions using the hand of a user according to a fourth embodiment.

In FIG. 28, first correspondence information 90 in the fourth embodiment is the same as the first correspondence information 61 in the first embodiment described above in terms of the movement directions of the hand 38 corresponding to the first gesture, which are the leftward direction and the rightward direction. On the other hand, the movement directions of the hand 38 corresponding to the second gesture are different, that is, the movement directions are not the upward direction and the downward direction but the forward direction and the backward direction. As illustrated by the lower two illustrations among the four illustrations on the left side, the forward direction is the direction in which the hand 38 is extended forward from the near side. To the contrary, the backward direction is the direction in which the hand 38 is drawn back to the near side from the far side.

In the fourth embodiment, the backward direction and the forward direction respectively correspond to the third direction and the fourth direction. A gesture in which the hand 38 is moved in the backward direction and a gesture in which the hand 38 is moved in the forward direction respectively correspond to the third-direction gesture and the fourth-direction gesture.

Figure 29:
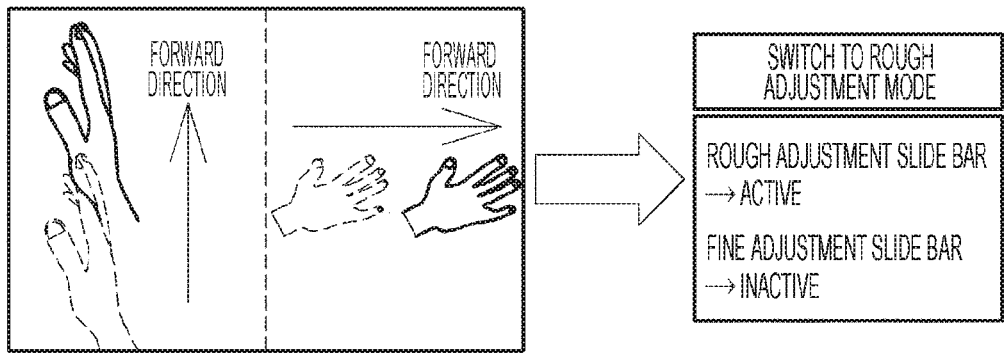
FIG. 29 is a diagram illustrating a relationship between a gesture and mode switching according to the fourth embodiment.
Figure 30:
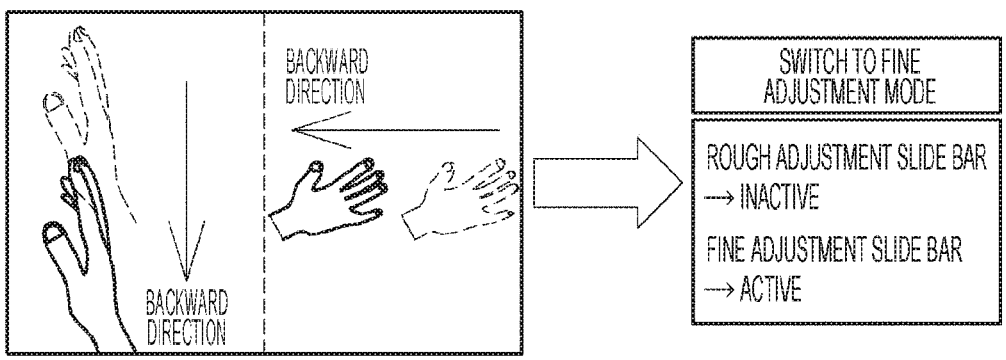
FIG. 30 is a diagram illustrating a relationship between a gesture and mode switching according to the fourth embodiment.

As illustrated in FIG. 29, in a case where the movement direction of the hand 38 indicated by the second gesture information from the second detection unit 71 is the forward direction and the mode before movement of the hand 38 is the fine adjustment mode, the mode switching unit 74 switches the mode to the rough adjustment mode. The display control unit 69 puts the rough adjustment slide bar 45A into an active state where setting of the numerical value is accepted, and puts the fine adjustment slide bar 45B into an inactive state where setting of the numerical value is not accepted. To the contrary, in a case where the movement direction of the hand 38 is the backward direction and the mode before movement of the hand 38 is the rough adjustment mode, the mode switching unit 74 switches the mode to the fine adjustment mode, as illustrated in FIG. 30. The display control unit 69 puts the rough adjustment slide bar 45A into the inactive state and puts the fine adjustment slide bar 45B into the active state. Note that, in the initial stage of numerical value setting, the rough adjustment mode is set similarly to the first embodiment described above.

Figure 31:
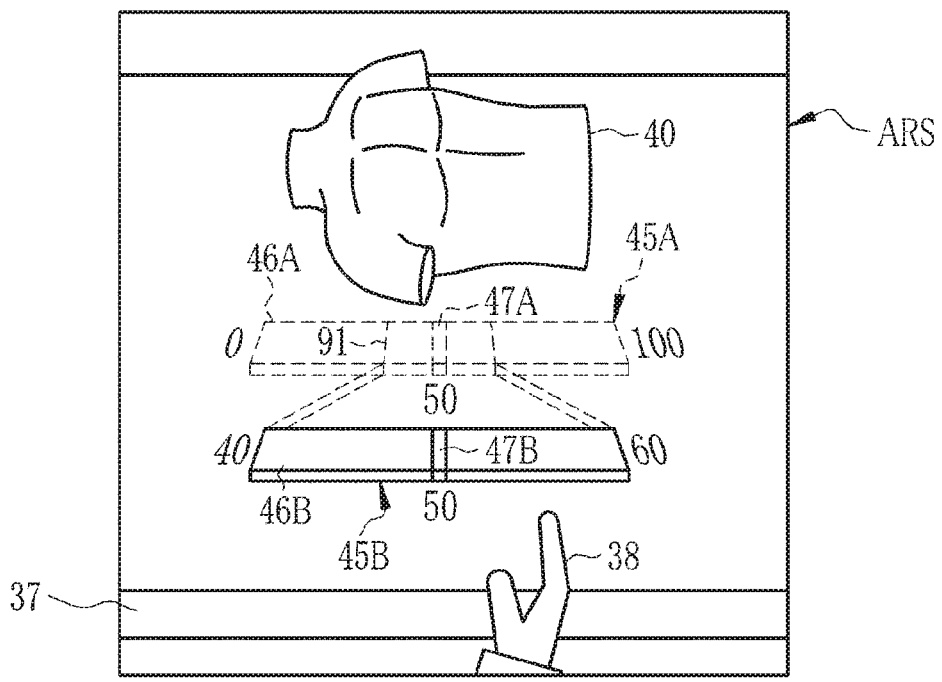
FIG. 31 is a diagram illustrating a fine adjustment mode in which the rough adjustment slide bar is in an inactive state and the fine adjustment slide bar is in an active state.

As illustrated in FIG. 31, in the augmented reality space ARS according to the fourth embodiment, both the rough adjustment slide bar 45A and the fine adjustment slide bar 45B are simultaneously displayed by the display control unit 69. The rough adjustment slide bar 45A is displayed on the far side and the fine adjustment slide bar 45B is displayed on the near side so as to correspond to the forward direction and the backward direction in the second gesture. The rough adjustment slide bar 45A and the fine adjustment slide bar 45B basically have the same structures as those in the first embodiment described above except that a range indication band 91 indicating the settable range of the fine adjustment slide bar 45B on the rough adjustment slide bar 45A is displayed on the bar 46A of the rough adjustment slide bar 45A, which is a difference.

Figures 32, 33:
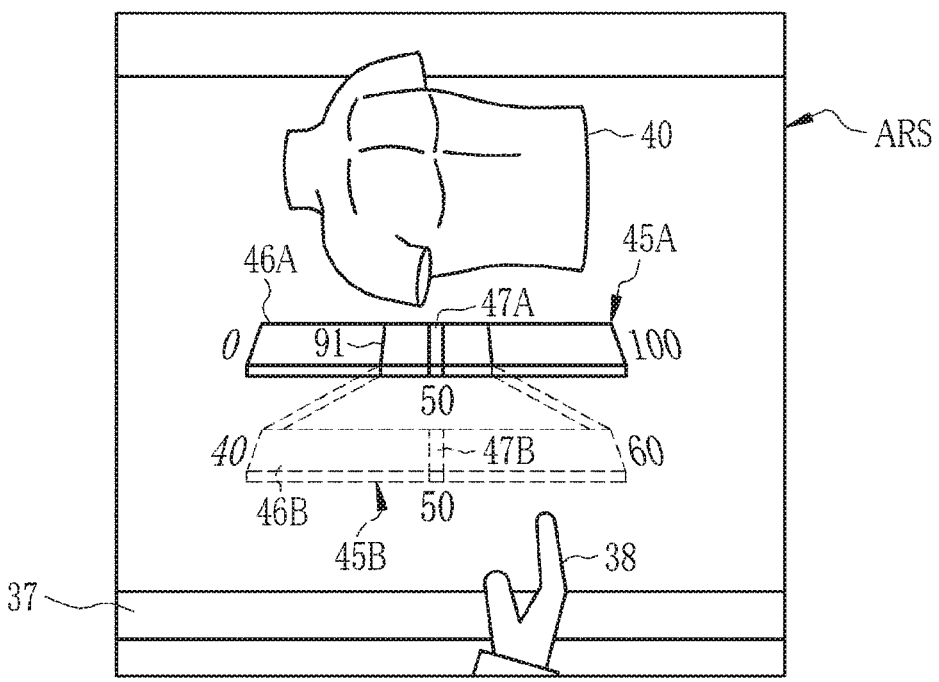
FIG. 32 is a diagram illustrating a rough adjustment mode in which the rough adjustment slide bar is in an active state and the fine adjustment slide bar is in an inactive state.
FIG. 33 is a diagram illustrating first correspondence information according to a fifth embodiment.

FIG. 31 illustrates the case of the fine adjustment mode. In this case, the fine adjustment slide bar 45B is in the active state, and the rough adjustment slide bar 45A is in the inactive state as described above. The rough adjustment slide bar 45A in the inactive state is displayed by the display control unit 69 as a semitransparent slide bar, as represented by a dashed line. On the other hand, in the case of the rough adjustment mode, the rough adjustment slide bar 45A is in the active state, and the fine adjustment slide bar 45B is in the inactive state. The fine adjustment slide bar 45B is displayed as a semitransparent slide bar, as illustrated in FIG. 32. That is, the display modes of the rough adjustment slide bar 45A and the fine adjustment slide bar 45B are made to differ in the active state and in the inactive state.

As described above, both the rough adjustment slide bar 45A and the fine adjustment slide bar 45B are simultaneously displayed, and therefore, a position in the entire settable range indicated by the rough adjustment slide bar 45A to which the numerical value set on the fine adjustment slide bar 45B corresponds can be known at a glance. The display modes of the rough adjustment slide bar 45A and the fine adjustment slide bar 45B are made to differ in the active state and in the inactive state, and therefore, it is possible to know the slide bar 45 that is in the active state. As a consequence, it is possible to know the current mode.

Fifth Embodiment

In the embodiments described above, the example has been described in which a numerical value is set by using two types of slide bars 45, namely, the rough adjustment slide bar 45A and the fine adjustment slide bar 45B. In a fifth embodiment illustrated in FIG. 33 to FIG. 35, a numerical value is set by using one slide bar 45.

In FIG. 33, first correspondence information 95 in the fifth embodiment is the same as the first correspondence information 61 in the first embodiment described above and the first correspondence information 90 in the fourth embodiment described above in terms of the movement directions of the hand 38 corresponding to the first gesture, which are the leftward direction and the rightward direction. On the other hand, the movement directions of the hand 38 corresponding to the second gesture are different, that is, the movement directions are the leftward direction to the rightward direction and the rightward direction to the leftward direction.

In the fifth embodiment, the leftward direction and the rightward direction respectively correspond to the first direction and the second direction. A gesture in which the hand 38 is moved in the rightward direction and a gesture in which the hand 38 is moved in the leftward direction respectively correspond to the first-direction gesture and the second-direction gesture. A gesture in which the movement direction of the hand 38 is switched from the leftward direction to the rightward direction and a gesture in which the movement direction of the hand 38 is switched from the rightward direction to the leftward direction correspond to switching gestures.

As illustrated in FIG. 34, third correspondence information 96 in the fifth embodiment indicates correspondences between the mode including the rough adjustment mode and two fine adjustment modes, namely, first and second fine adjustment modes, the number of switching gestures, and the unit change width for a numerical value.

In the fifth embodiment, a numerical value is set by using one slide bar 45, and therefore, the settable range remains unchanged in all modes. Accordingly, unlike the third correspondence information 63 in the first embodiment described above, the third correspondence information 96 does not include the item of the range of settable numerical values but includes the item of the number of switching gestures instead.

To the rough adjustment mode, 0 is made to correspond as the number of switching gestures, and ±10 (corresponding to the first change width) is made to correspond as the unit change width. On the other hand, to the first fine adjustment mode, 1 is made to correspond as the number of switching gestures, and ±5 (corresponding to the second change width) is made to correspond as the unit change width. To the second fine adjustment mode, 2 or more is made to correspond as the number of switching gestures, and ±1 (corresponding to the second change width) is made to correspond as the unit change width. Accordingly, a numerical value changes by ±10 in the rough adjustment mode while a numerical value changes by ±5 in the first fine adjustment mode and changes by ±1 in the second fine adjustment mode relative to the same movement amount of the hand 38.

Figure 35:
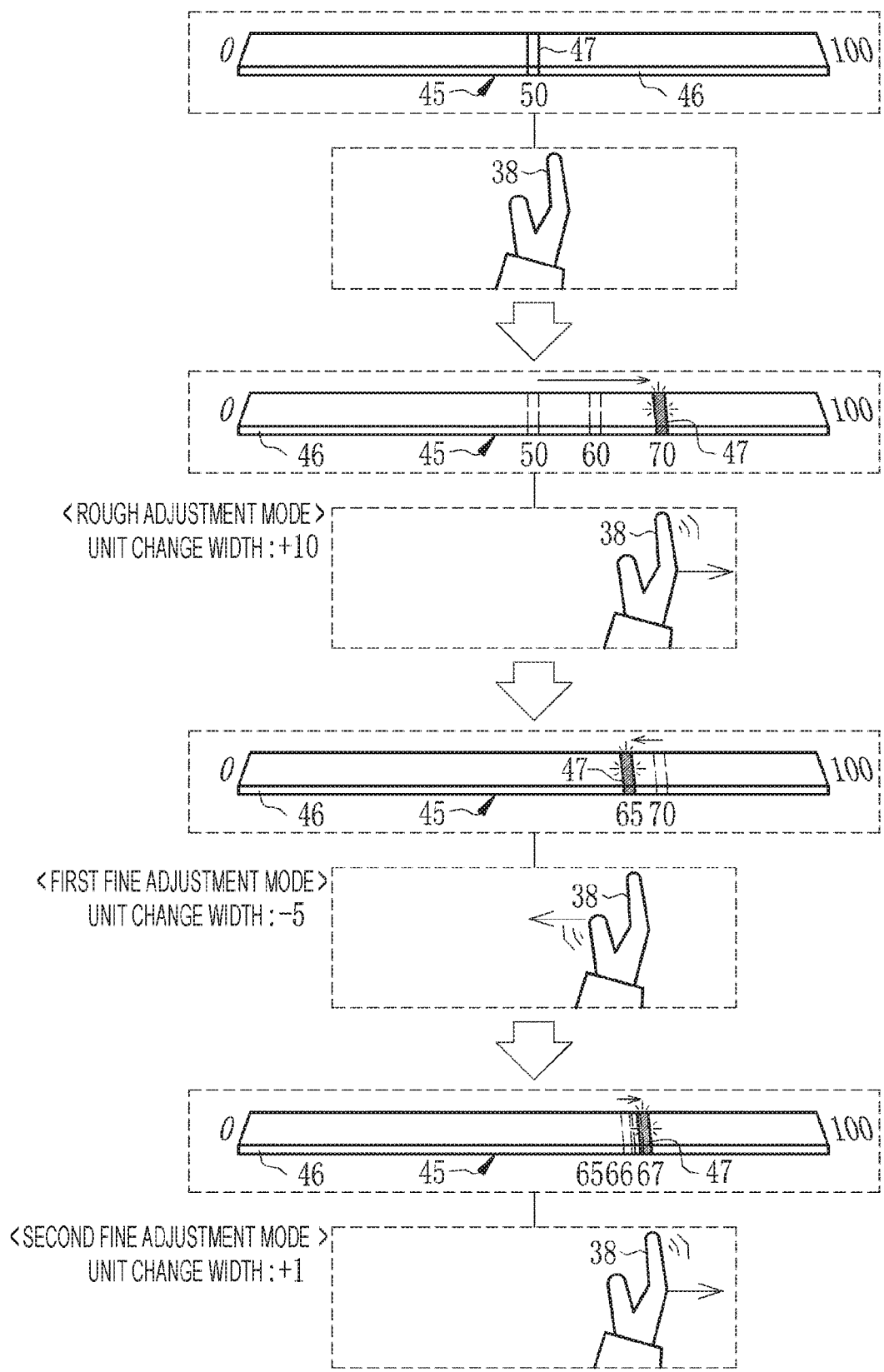
FIG. 35 is a diagram illustrating a state of numerical value setting according to the fifth embodiment.

FIG. 35 illustrates changes in the display position of the slider 47 of the slide bar 45 in the fifth embodiment. Here, the slide bar 45 is a bar in which the entire settable range is represented by the bar 46, and is the same as the rough adjustment slide bar 45A in the embodiments described above. The top illustration illustrates a state before a numerical value is set by moving the hand 38, which is an initial state where the slider 47 points "50". In the state illustrated in the top illustration, the number of switching gestures is 0 and the mode is the rough adjustment mode. In a case where the hand 38 moves in the rightward direction, as illustrated in the second illustration, from the state illustrated in the top illustration, the movement of the hand 38 in the rightward direction is detected by the first detection unit 70. Then, the numerical value is changed by the numerical value change unit 73 on the basis of the unit change width of +10. The slider 47 is moved by the display control unit 69 by +10 from the position corresponding to "50" to the positions corresponding to "60" and "70".

In a case where the numerical value reaches 70, and thereafter, the hand 38 moves in the leftward direction, as illustrated in the third illustration, it is determined by the second detection unit 71 that the movement direction of the hand 38 is switched from the rightward direction to the leftward direction, that is, a first switching gesture is performed. Accordingly, the mode is switched from the rough adjustment mode to the first fine adjustment mode by the mode switching unit 74. Movement of the hand 38 in the leftward direction is detected by the first detection unit 70. Then, the numerical value is changed by the numerical value change unit 73 on the basis of the unit change width of −5. The slider 47 is moved by the display control unit 69 by −5 from the position corresponding to "70" to the position corresponding to "65".

In a case where the numerical value reaches 65, and thereafter, the hand 38 moves in the rightward direction again, as illustrated in the bottom illustration, it is determined by the second detection unit 71 that the movement direction of the hand 38 is switched from the leftward direction to the rightward direction, that is, a second switching gesture is performed. Accordingly, the mode is switched from the first fine adjustment mode to the second fine adjustment mode by the mode switching unit 74. Movement of the hand 38 in the rightward direction is detected by the first detection unit 70. Then, the numerical value is changed by the numerical value change unit 73 on the basis of the unit change width of −1. The slider 47 is moved by the display control unit 69 by +1 from the position corresponding to "65" to the positions corresponding to "66" and "67".

As described above, the unit change width used after a switching gesture is made narrower than the unit change width used before the switching gesture to thereby enable a rough adjustment and a fine adjustment of the numerical value using one slide bar 45. Unlike the embodiments described above, the rough adjustment slide bar 45A and the fine adjustment slide bar 45B need not be selectively displayed or need not be displayed simultaneously, which leads to simple display. Note that the example case of three modes, namely, the rough adjustment mode and the first and second fine adjustment modes, has been described here; however, the number of modes may be two, namely, the rough adjustment mode and the fine adjustment mode, as in the embodiments described above, or three more. However, to the mode that is set last, the minimum value (here, ±1) is always made to correspond as the unit change width.

Sixth Embodiment

Figure 36:
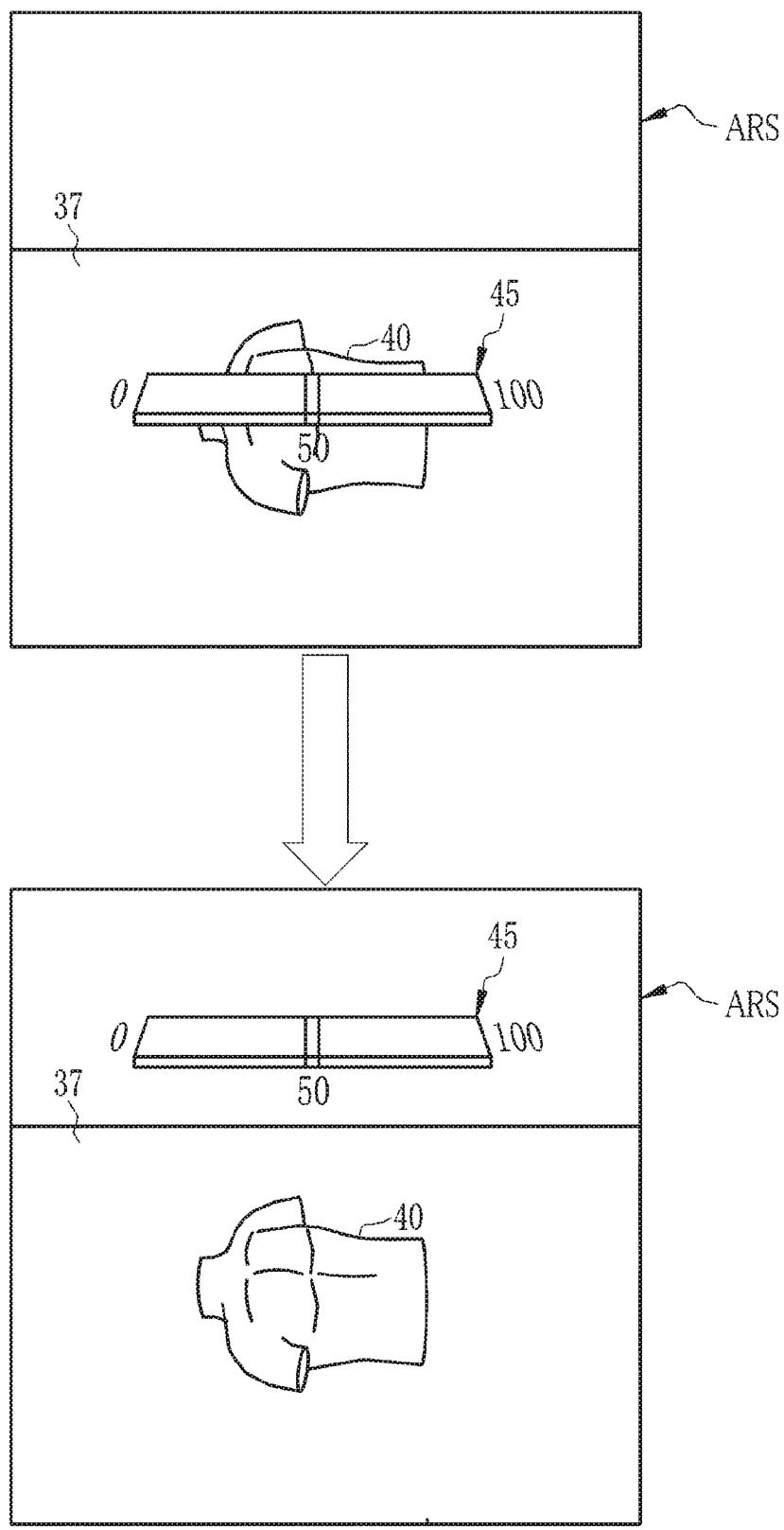
FIG. 36 is a diagram illustrating a sixth embodiment in which, in a case where the size of a part of a 3D image hidden behind a slide bar is equal to or larger than a set size, the display position of the slide bar is changed to a position so as not to hide the 3D image.

In a sixth embodiment illustrated in FIG. 36, a measure is taken so that visibility of the 3D image 40 is not impeded by the slide bar 45. In the embodiments described above, the example case has been described in which the slide bar 45 is displayed on the near side of the 3D image 40 in the augmented reality space ARS, as illustrated in, for example, FIG. 16 and FIG. 17, so that the display position of the 3D image 40 and that of the slide bar 45 do not match. However, depending on a positional relationship between the HMD 11 (user 14) and the marker 39, the display position of the 3D image 40 and that of the slide bar 45 may match.

In this case, a part of the 3D image 40 is hidden behind the slide bar 45 because the slide bar 45 is basically displayed on the near side of the 3D image 40. If the area of the hidden part is relatively small, visual recognition of the 3D image 40 by the user 14 might not be impeded. However, in a case where a part of the 3D image 40 having a relatively large area is hidden behind the slide bar 45, the user 14 may have difficulty in visually recognizing the 3D image 40.

Therefore, as illustrated in the upper illustration in FIG. 36, in a case where the size of a part of the 3D image 40 hidden behind the slide bar 45 in the augmented reality space ARS is equal to or larger than a set size, the display control unit 69 changes the display position of the slide bar 45 to a position on the far side so as not to hide the 3D image 40, as illustrated in the lower illustration in FIG. 36. The set size is, for example, one-half of the display area of the 3D image 40 in the augmented reality space ARS, and may be set in advance or may be set by the user 14. Note that, in a case where a part of the 3D image 40 hidden behind the slide bar 45 is smaller than the set size, the display position of the slide bar 45 is kept unchanged.

As described above, in a case of an arrangement relationship in which a part of the 3D image 40 hidden behind the slide bar 45 has the set size, the display position of the slide bar 45 is changed to a position so as not to hide the 3D image 40, and therefore, a situation where visibility of the 3D image 40 is impeded by the slide bar 45 is prevented from occurring. Accordingly, the conference can progress in a state where the 3D image 40 is always visible to the user 14.

Seventh Embodiment

Figure 37:
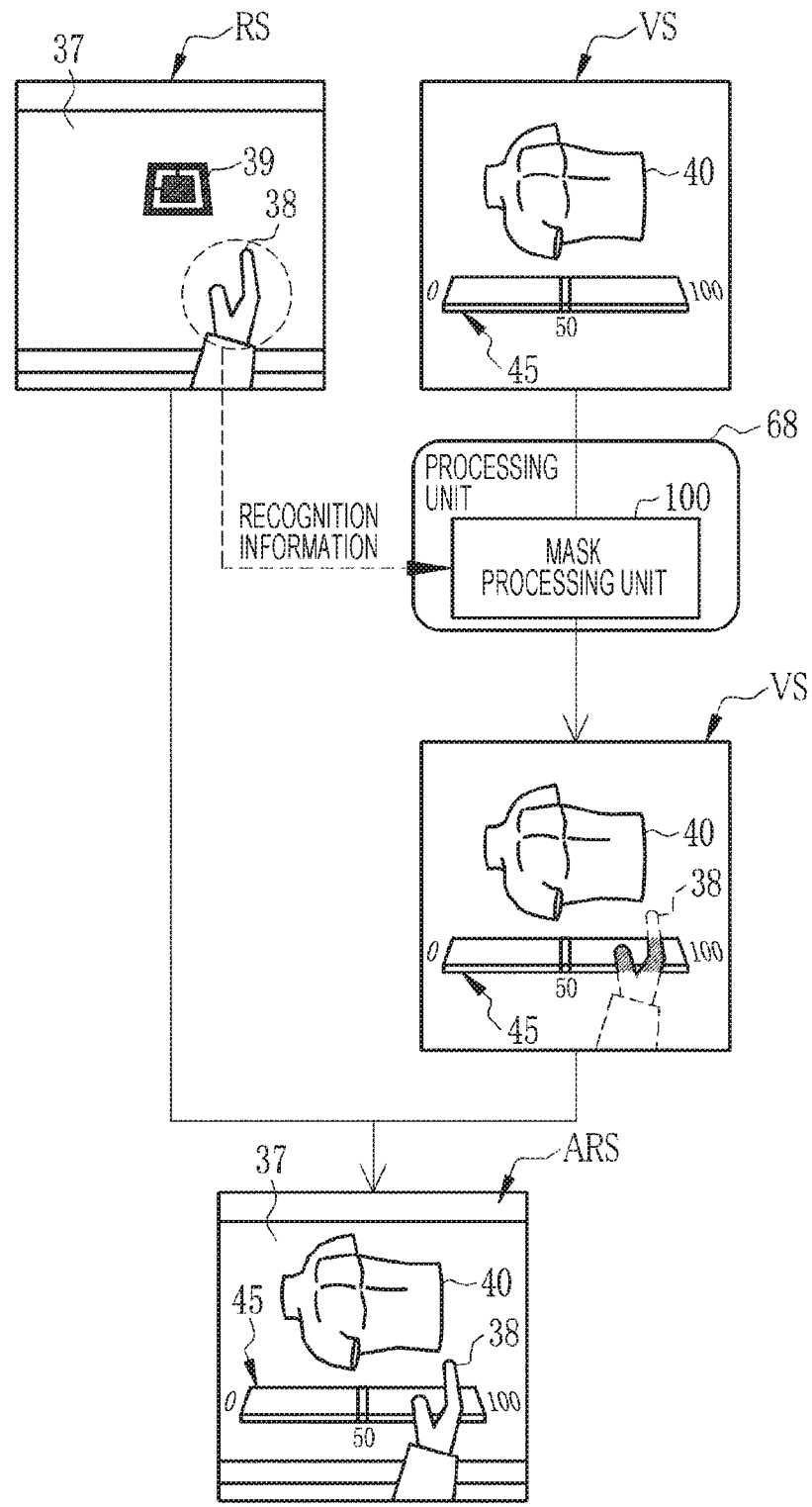
FIG. 37 is a diagram illustrating a seventh embodiment in which a part of a slide bar overlapping with the hand of a user is masked.

In a seventh embodiment illustrated in FIG. 37, a part of the slide bar 45 overlapping with the hand 38 of the user 14 is masked. In the embodiments described above, the example case has been described in which the hand 38 of the user 14 and the slide bar 45 do not overlap in the augmented reality space ARS, as illustrated in, for example, FIG. 16 and FIG. 17. However, the hand 38 and the slide bar 45 may overlap as in the case of the 3D image 40 and the slide bar 45 in the sixth embodiment described above.

If a display mode in which, in a case where the hand 38 and the slide bar 45 overlap, the hand 38 is hidden behind the slide bar 45 is employed, the hand 38, which is the hand of the user 14, is not visible to the user 14, which may feel uneasy to the user 14.

Accordingly, as illustrated in FIG. 37, the processing unit 68 according to the seventh embodiment is provided with a mask processing unit 100 in addition to the numerical value change unit 73 and so on (not illustrated) according to the first embodiment described above. The mask processing unit 100 masks a part of the slide bar 45 overlapping with the hand 38 in the virtual space VS on the basis of information (hereinafter referred to as "recognition information") about the hand 38 recognized by the detection unit 67 in a captured image from the camera 29, the captured image being an image of the real space RS. Specifically, the recognition information includes the position coordinates of pixels that constitute the outline of the hand 38. Specifically, mask processing is a process for cutting a part corresponding to the outline of the hand 38 from the slide bar 45.

When such mask processing is performed, the hand 38 is displayed without being hidden behind the slide bar 45 in the augmented reality space ARS that is recognized by the user 14 through the HMD 11. Accordingly, the user 14 can set a numerical value without an uneasy feeling.

Eighth Embodiment

In the embodiments described above, the hand 38 of the user 14 is recognized. In an eighth embodiment illustrated in FIG. 38, the hand 38 of the user 14 is recognized from a glove 105 that is worn on the hand 38 of the user 14.

Figure 38:
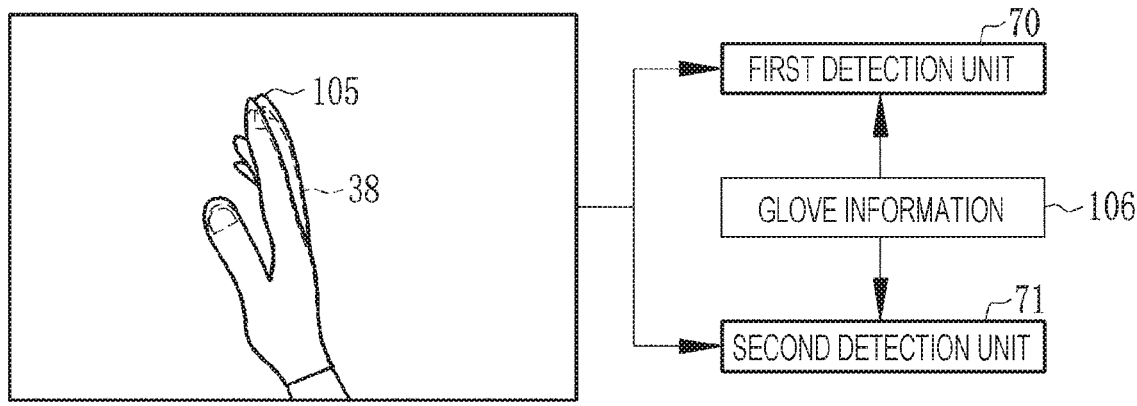
FIG. 38 is a diagram illustrating an eighth embodiment in which the hand of a user is recognized from a glove that is worn on the hand.

In the eighth embodiment illustrated in FIG. 38, the user 14 makes a gesture in a state where the user 14 is wearing the glove 105 on the hand 38. The glove 105 is, for example, a rubber surgical glove that is entirely colored blue. The first detection unit 70 and the second detection unit 71 recognize the glove 105 present in a captured image from the camera 29 as the hand 38 by referring to glove information 106. The glove information 106 is information indicating the color of the glove 105 and the form of the glove 105 when viewed at various angles, and is stored in the storage device 50. The first detection unit 70 and the second detection unit 71 recognize a part, of the captured image from the camera 29, that matches the color and form indicated by the glove information 106 as the glove 105.

As described above, the hand 38 of the user 14 is recognized from the glove 105, and therefore, recognition accuracy for the hand 38 can be made higher than in a case of recognizing the hand 38 on which the glove 105 is not worn. Accordingly, detection errors, such as erroneous detection of the first gesture as the second gesture or overlooking of a gesture, can be reduced. Note that the glove 105 is not limited to a rubber surgical glove and may be a dedicated glove for the image display system 10.

Note that, regarding the rough adjustment mode and the fine adjustment mode, in addition to the form in the embodiments described above in which the mode is switched in an alternative manner, an analog-like form described below may be employed.

For example, in a case where a gesture is detected by the second detection unit 71 in which the hand 38 is moved in the upward direction for one slide bar 45 illustrated in FIG. 35 in the fifth embodiment described above, the lower limit value and the upper limit value of the bar 46 are changed from 0 and 100 to 1 and 99, 2 and 98, 3 and 97, and so on in a successive and gradual manner to narrow the range of settable numerical values. On the other hand, in a case where a gesture is detected by the second detection unit 71 in which the hand 38 is moved in the downward direction, the lower limit value and the upper limit value of the bar 46 are changed from 3 and 97 to 2 and 98, 1 and 99, and 0 and 100 in a successive and gradual manner to widen the range of settable numerical values.

Then, the change width in the case where the range of settable numerical values is narrow is made narrower than that in the case where the range of settable numerical values is wide. For example, in a case where the lower limit value and the upper limit value are 0 and 100 and in a case where the lower limit value and the upper limit value are 1 and 99, the change width is set to ±20, and in a case where the lower limit value and the upper limit value are 2 and 98 and in a case where the lower limit value and the upper limit value are 3 and 97, the change width is set to ±15.

In this form, a state during the period in which the range of settable numerical values is narrowed by moving the hand 38 in the upward direction and after the range of settable numerical values has been narrowed corresponds to the fine adjustment mode. To the contrary, a state during the period in which the range of settable numerical values is widened by moving the hand 38 in the downward direction and after the range of settable numerical values has been widened corresponds to the rough adjustment mode. The gesture in which the hand 38 is moved in the upward direction or in the downward direction corresponds to the second gesture.

In the embodiments described above, the slide bar 45 constituted by the horizontal bar 46 has been described, for example; however, the present invention is not limited to this slide bar. For example, a slide bar constituted by a vertical bar for which a lower limit value is indicated at the lower end and an upper limit value is indicated at the upper end may be used. In the case of the slide bar constituted by the vertical bar, the upward direction and the downward direction respectively correspond to the first direction and the second direction, and a gesture in which the hand 38 is moved in the upward direction and a gesture in which the hand 38 is moved in the downward direction respectively correspond to the first-direction gesture and the second-direction gesture.

In a case of applying the slide bar constituted by the vertical bar to the fourth embodiment in which both the rough adjustment slide bar 45A and the fine adjustment slide bar 45B are simultaneously displayed, the rough adjustment slide bar 45A and the fine adjustment slide bar 45B are arranged side by side and displayed. In this case, the leftward direction and the rightward direction respectively correspond to the third direction and the fourth direction, and a gesture in which the hand 38 is moved in the leftward direction and a gesture in which the hand 38 is moved in the rightward direction respectively correspond to the third-direction gesture and the fourth-direction gesture.

Figure 39:
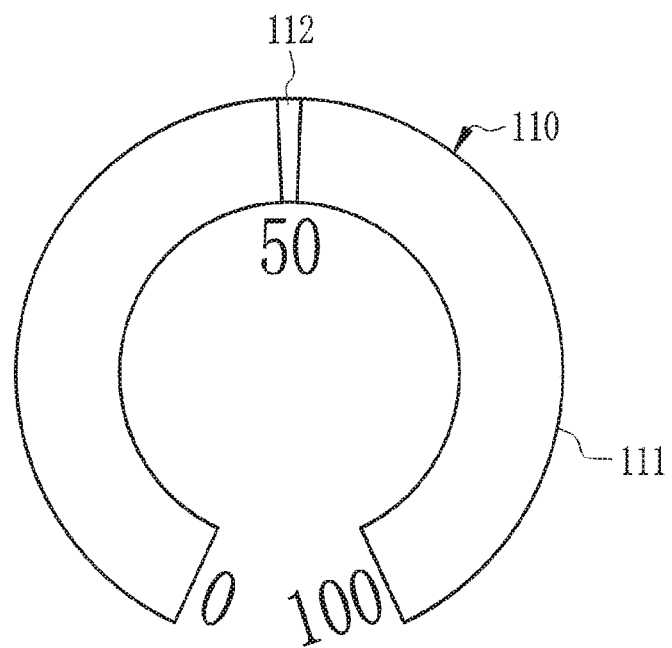
FIG. 39 is a diagram illustrating another example slide bar.

Alternatively, a slide bar 110 illustrated in FIG. 39 may be used. The slide bar 110 is constituted by a C-shaped bar 111 formed of a ring in which a lower part is cut out and a slider 112 for which a slide operation on the bar 111 is performed. At the left end of the bar 111, a lower limit value is indicated, and at the right end thereof, an upper limit value is indicated. In this case, the clockwise direction and the counterclockwise direction respectively correspond to the first direction and the second direction, and a gesture in which the hand 38 is moved in the clockwise direction and a gesture in which the hand 38 is moved in the counterclockwise direction respectively correspond to the first-direction gesture and the second-direction gesture.

As described above, the structure of the slide bar is not limited to a specific structure, and the movement directions of the hand 38 may be changed in accordance with the structure of the slide bar and is not limited to specific directions.

Figure 40:
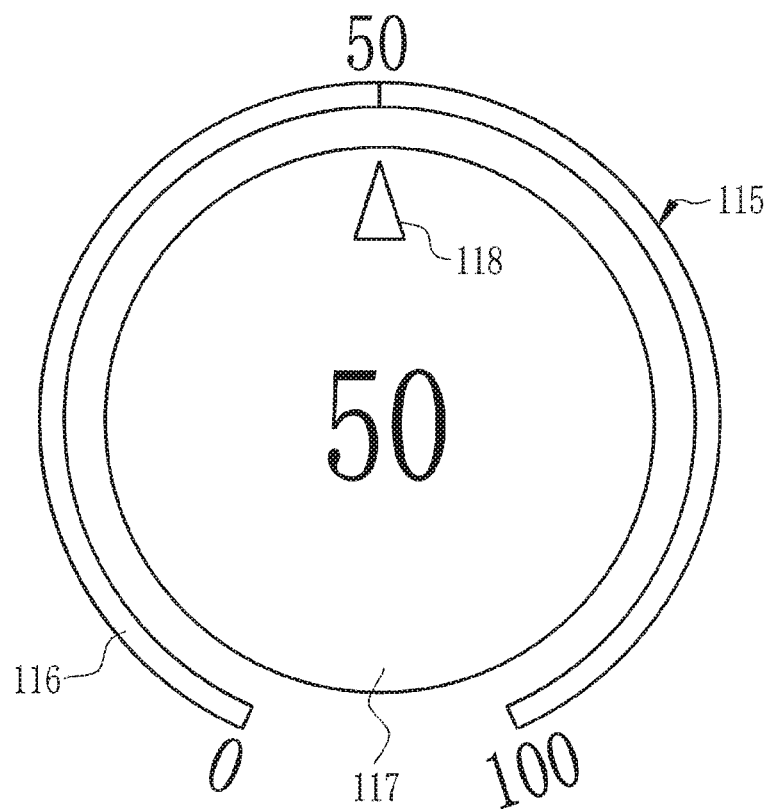
FIG. 40 is a diagram illustrating a rotational dial.

In the embodiments described above, the slide bar has been described as the numerical value setting UI, for example; however, the present invention is not limited to this numerical value setting UI. As illustrated in FIG. 40, for example, a rotational dial 115 may be used as the numerical value setting UI. The rotational dial 115 is constituted by a C-shaped bar 116, which is the range display part, a dial main body 117, and a triangular mark 118, which is the numerical value indication part, provided on the dial main body 117. On the dial main body 117, a currently set numerical value is displayed.

In this case, the clockwise direction and the counterclockwise direction respectively correspond to the first direction and the second direction, and a gesture in which the hand 38 is moved in the clockwise direction and a gesture in which the hand 38 is moved in the counterclockwise direction respectively correspond to the first-direction gesture and the second-direction gesture, as in the case of the slide bar 110 illustrated in FIG. 39.

The HMD 11 is not limited to the type in which the protective frame 27 in a goggle form entirely covers the both eyes of the user 14 and the band part 26 is fixed to the head of the user 14 as in the embodiments described above. An eyeglass-type HMD having temples that fit around the ears of the user 14, nose pads that rest below the inner corners of the eyes, a rim for holding the screen, and so on may be used.

The camera 29 need not be mounted on the HMD 11. The camera 29 may be placed at any position as long as at least an image of the hand 38 of the user 14 can be captured. Therefore, the camera 29 need not capture an image of the field of view that is the same as the augmented reality space ARS recognized by the user 14 through the HMD 11.

The number of users 14 is three in the embodiments described above; however, the number of users 14 may be one, two, or three or more.

In the embodiments described above, the technique is used in which a position at which a virtual object appears is defined by using the marker 39; however, a technique may be employed in which a virtual object is made to appear on a set specific actual object without using the marker 39. In this case, the specific actual object present in a captured image is recognized by using an image recognition technique, the recognized specific actual object is assumed to be the marker 39, and a virtual object is displayed on the specific actual object.

In the embodiments described above, the functions of the control apparatus for the HMD 11 are fulfilled by a desktop personal computer; however, the present invention is not limited to this. The image accumulation server 19 may fulfill all or some of the functions of the control apparatus for the HMD 11. For example, the function of the 3D image editing unit 75 is fulfilled by the image accumulation server 19. In this case, a 3D image may be distributed to the HMD 11 from the image accumulation server 19 through streaming.

Figure 41:
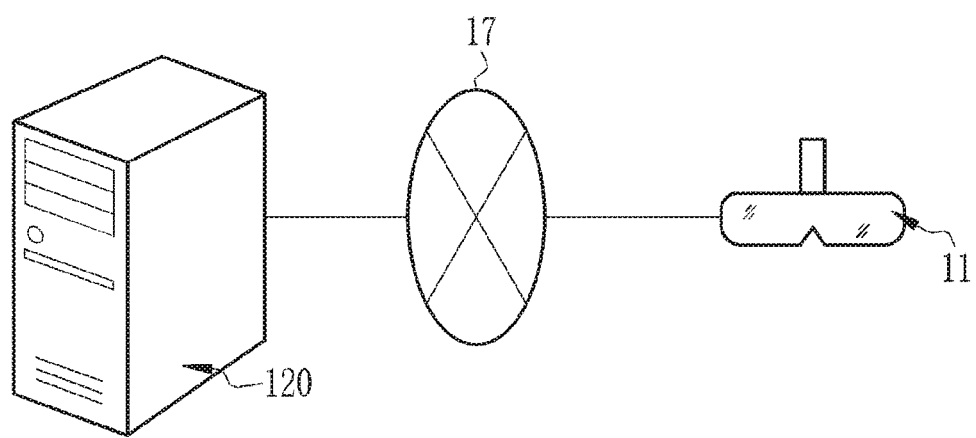
FIG. 41 is a diagram illustrating another example of the control apparatus.

Alternatively, a network server 120 different from the image accumulation server 19 may fulfill the functions of the control apparatus for the HMD 11, as illustrated in FIG. 41. Further, a local server placed in the medical facility 13 may fulfill the functions of the control apparatus for the HMD 11. The image accumulation server 19 may be placed in the medical facility 13 as a local server.

Figure 42:
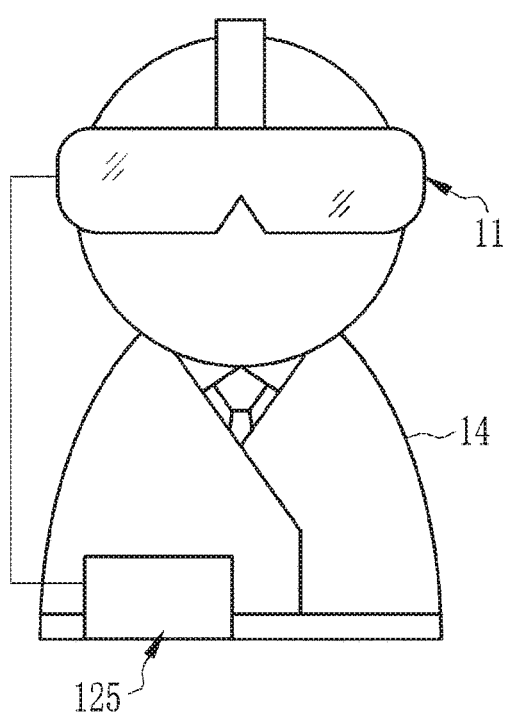
FIG. 42 is a diagram illustrating yet another example of the control apparatus.

Alternatively, a portable computer 125 that the user 14 can wear on, for example, the waist and carry may fulfill the functions of the control apparatus for the HMD 11, as illustrated in FIG. 42. In this case, the computer that fulfills the functions of the control apparatus for the HMD 11 may be a dedicated product specific to the image display system 10 instead of a commercially available personal computer, such as the control apparatus 12. The functions of the control apparatus may be included in the HMD 11 itself. In this case, the HMD 11 itself functions as the control apparatus.

As described above, various modifications can be made to the hardware configuration of the computer that constitutes the control apparatus for the HMD 11 according to the present invention. The control apparatus for the HMD 11 can be constituted by a plurality of computers that are separated hardware units for the purpose of improving processing capacity and reliability. For example, the functions of the captured-image obtaining unit 65 and the detection unit 67 and the functions of the 3D image obtaining unit 66, the processing unit 68, and the display control unit 69 may be distributed to and fulfilled by two respective computers. In this case, the two computers constitute the control apparatus for the HMD 11.

As described above, the hardware configuration of the computer can be changed as appropriate in accordance with requested performance, such as processing capacity, safety, reliability, and so on. Further, in addition to the hardware, an AP, such as the operation program 60, can be duplicated or can be distributed to and stored in a plurality of storage devices for the purpose of attaining safety and reliability.

The 3D image 40 is not limited to the image of the upper half of the target patient lying on their back. The 3D image 40 may be an image of the whole body of the target patient lying on their back or may be an image of another part, such as the head.

In the embodiments described above, the image display system 10 is applied to the preoperative conference that is held in the medical facility 13, and the 3D image 40 is assumed to be the virtual object, for example. However, application of the image display system 10 to the preoperative conference is not restrictive, and the virtual object is not limited to the 3D image 40 accordingly. For example, the image display system 10 may be applied to gaming and, for example, a game character may be displayed as the virtual object.

In the embodiments described above, for example, the processing units that perform various types of processing, namely, the captured-image obtaining unit 65, the 3D image obtaining unit 66, the detection unit 67 (the first detection unit 70, the second detection unit 71, and the third detection unit 72), the processing unit 68 (the numerical value change unit 73, the mode switching unit 74, the 3D image editing unit 75, and the mask processing unit 100), and the display control unit 69, are implemented as various processors as described below in terms of hardware structure.

The various processors include a CPU, a programmable logic device (PLD), a dedicated electric circuit, and so on. As is well known, a CPU is a general-purpose processor that executes software (program) to function as the processing units. A PLD is a processor, such as an FPGA (field-programmable gate array), for which the circuit configuration can be changed after manufacturing. A dedicated electric circuit is a processor, such as an ASIC (application-specific integrated circuit), having a circuit configuration specifically designed to perform a specific process.

One processing unit may be constituted by one of the various processors or a combination of two or more processors of the same type or different types (for example, a combination of a plurality of FPGAs or a combination of a CPU and an FPGA). Further, a plurality of processing units may be constituted by one processor. A first example configuration in which a plurality of processing units are constituted by one processor is a form in which one or more CPUs and software are combined to constitute one processor, and the processor functions as the plurality of processing units. A second example configuration is a form in which a processor that implements the functions of the entire system including the plurality of processing units with one IC chip is used, a representative example of the form being a form of using a system on a chip (SoC). As described above, in terms of hardware structure, the processing units are constituted by one or more of the processors described above.

Further, more specifically, in terms of hardware structure, these processors are implemented as electric circuitry obtained by combining circuit devices, such as semiconductor devices.

On the basis of the above description, an image display system described in additional item 1 below can be determined.

Additional Item 1

An image display system including: a head-mounted display that is worn on a head of a user; and a control apparatus for the head-mounted display to allow the user to recognize, through the head-mounted display, an augmented reality space obtained by merging a real space with a virtual space, including:

a display control processor that causes at least one numerical value setting user interface to be displayed on the head-mounted display as a virtual user interface that is virtually recognized by the user in the augmented reality space, the numerical value setting user interface being constituted by a range display part that shows a range of settable numerical values and a numerical value indication part that points a numerical value, among the numerical values, that is currently set;

a first detection processor that detects a first gesture made by the user for setting the numerical value;

a second detection processor that detects a second gesture made by the user for switching between a rough adjustment mode and a fine adjustment mode, the rough adjustment mode being a mode in which the range is a first range or/and a unit change width for the numerical value is a first change width, the fine adjustment mode being a mode in which the range is a second range narrower than the first range or/and the unit change width is a second change width narrower than the first change width;

a numerical value change processor that changes the numerical value in accordance with the first gesture; and a mode switching processor that switches between the rough adjustment mode and the fine adjustment mode in accordance with the second gesture.

In the present invention, any of the above-described embodiments and modifications can be combined as appropriate. For example, the third embodiment and the fourth embodiment may be combined and implemented, or the third embodiment and the fifth embodiment may be combined and implemented. The present invention is not limited to the above-described embodiments, and various configurations can be employed without departing from the spirit of the present invention, as a matter of course. Further, the present invention covers not only the program but also a recording medium storing the program.

REFERENCE SIGNS LIST 10 image display system
11, 11A to 11C head-mounted display (HMD)
12 control apparatus
13 medical facility
14, 14A to 14C user
15 display
16 input device
17 network
18 data center
19 image accumulation server
25 main body part
26 band part
27 protective frame
28 screen
29 camera
30 cable
31 horizontal band
32 vertical band
35 operating room
37 operation table
38, 38A, 38B, 38C hand
39 marker
40 three-dimensional volume rendering image (3D image)
45, 110 slide bar
45A rough adjustment slide bar
45B fine adjustment slide bar
46, 46A, 46B, 111 bar (range display part)
47, 47A, 47B, 112 slider (numerical value indication part)
50 storage device
51 memory
52 CPU
53 communication unit
54 data bus
60 operation program
61, 90, 95 first correspondence information
62 second correspondence information
63, 96 third correspondence information
65 captured-image obtaining unit
66 3D image obtaining unit
67 detection unit
68 processing unit 69 display control unit
70 first detection unit
71 second detection unit
72 third detection unit
73 numerical value change unit
74 mode switching unit
75 3D image editing unit
80 wall
85A to 85C area
91 range indication band
100 mask processing unit
105 glove
106 glove information
115 rotational dial
116 bar (range display part)
117 dial main body
118 triangular mark (numerical value indication part)
120 network server (control apparatus)
125 portable computer (control apparatus)
ARS, ARS-A to ARS-C augmented reality space
RS, RS-A real space
VS, VS-A virtual space
S10 to S14, S100 to S190 step

What is claimed is:

1. An image display system comprising: a head-mounted display that is worn on a head of a user; and a control apparatus for the head-mounted display to allow the user to recognize, through the head-mounted display, an augmented reality space obtained by merging a real space with a virtual space, comprising:
   a display control unit that causes at least one numerical value setting user interface to be displayed on the head-mounted display as a virtual user interface that is virtually recognized by the user in the augmented reality space, the numerical value setting user interface being constituted by a range display part that shows a range of settable numerical values and a numerical value indication part that points a numerical value, among the numerical values, that is currently set;
   a first detection unit that detects a first gesture made by the user for setting the numerical value;
   a second detection unit that detects a second gesture made by the user for switching between a rough adjustment mode and a fine adjustment mode,
   the rough adjustment mode being a mode in which the range is a first range, in which a unit change width for the numerical value is a first change width, or in which the range is the first range and the unit change width for the numerical value is the first change width,
   the fine adjustment mode being a mode in which the range is a second range narrower than the first range, in which the unit change width is a second change width narrower than the first change width, or in which the range is the second range narrower than the first range and the unit change width is the second change width narrower than the first change width;
   a numerical value change unit that changes the numerical value in accordance with the first gesture; and
   a mode switching unit that switches between the rough adjustment mode and the fine adjustment mode in accordance with the second gesture.

2. The image display system according to claim 1, wherein the first detection unit and the second detection unit respectively detect the first gesture and the second gesture in a state where a hand of the user is not in contact with the numerical value setting user interface in the augmented reality space.

3. The image display system according to claim 1, wherein the display control unit causes the numerical value setting user interface to be displayed at a remote position that is out of reach of the hand of the user in the augmented reality space.

4. The image display system according to claim 1, wherein
   the first gesture includes a first-direction gesture in which the hand of the user is moved in a first direction and a second-direction gesture in which the hand of the user is moved in a second direction opposite to the first direction, and
   the second gesture includes a third-direction gesture in which the hand of the user is moved in a third direction different from the first direction and a fourth-direction gesture in which the hand of the user is moved in a fourth direction different from the second direction and opposite to the third direction.

5. The image display system according to claim 4, wherein
   the first detection unit detects presence of the hand of the user at a reference position and a direction in which the hand of the user moves from the reference position, and
   the numerical value change unit automatically changes the numerical value from when movement of the hand of the user in one of the first direction or the second direction, is detected until when a return of the hand of the user to the reference position is detected.

6. The image display system according to claim 4, wherein the display control unit causes a rough adjustment interface for the rough adjustment mode and a fine adjustment interface for the fine adjustment mode to be displayed as the numerical value setting user interface.

7. The image display system according to claim 6, wherein the display control unit causes the rough adjustment interface and the fine adjustment interface to be selectively displayed.

8. The image display system according to claim 7, wherein the display control unit causes the fine adjustment interface to be displayed in a larger size on a nearer side than the rough adjustment interface in the augmented reality space.

9. The image display system according to claim 6, wherein the display control unit causes both the rough adjustment interface and the fine adjustment interface to be simultaneously displayed, and
   the display control unit puts one of the rough adjustment interface or the fine adjustment interface into an active state where setting of the numerical value is accepted, and puts the other into an inactive state where setting of the numerical value is not accepted.

10. The image display system according to claim 9, wherein the display control unit makes a display mode of the rough adjustment interface and a display mode of the fine adjustment interface differ in the active state and in the inactive state.

11. The image display system according to claim 6, wherein, in a case where the numerical value reaches an upper limit value or a lower limit value of the second range on the fine adjustment interface, and thereafter, the first gesture is further detected, the display control unit changes display of the second range of the range display part.

12. The image display system according to claim 1, wherein
   the first gesture includes a first-direction gesture in which the hand of the user is moved in a first direction and a second-direction gesture in which the hand of the user is moved in a second direction opposite to the first direction, the second gesture is a switching gesture in which a movement direction of the hand of the user is switched from one of the first direction or the second direction to the other, and the mode switching unit makes the unit change width used after the switching gesture narrower than the unit change width used before the switching gesture.

13. The image display system according to claim 1, wherein the display control unit makes a display mode of the numerical value indication part differ in a case where the first gesture is detected and in a case where the first gesture is not detected.

14. The image display system according to claim 1, wherein the numerical value setting user interface is a slide bar constituted by a bar that functions as the range display part and a slider that functions as the numerical value indication part and for which a slide operation on the bar is performed.

15. The image display system according to claim 1, wherein the display control unit causes a virtual object for which a display position in the real space is fixed to be displayed on the head-mounted display in addition to the numerical value setting user interface, and in a case where a size of a part of the virtual object, the part being hidden behind the numerical value setting user interface in the augmented reality space, is equal to or larger than a set size, the display control unit changes a display position of the numerical value setting user interface to a position so as not to hide the virtual object.

16. The image display system according to claim 1, wherein the first detection unit and the second detection unit recognize the hand of the user by analyzing a captured image of the hand of the user, and respectively detect the first gesture and the second gesture made by using the recognized hand of the user.

17. The image display system according to claim 16, wherein the first detection unit and the second detection unit recognize the hand of the user from a glove that is worn on the hand of the user.

18. The image display system according to claim 16, further comprising a mask processing unit that masks a part of the numerical value setting user interface, the part overlapping with the recognized hand of the user.

19. A control apparatus for a head-mounted display that is worn on a head of a user to allow the user to recognize an augmented reality space obtained by merging a real space with a virtual space, comprising:

a display control unit that causes at least one numerical value setting user interface to be displayed on the head-mounted display as a virtual user interface that is virtually recognized by the user in the augmented reality space, the numerical value setting user interface being constituted by a range display part that shows a range of settable numerical values and a numerical value indication part that points a numerical value, among the numerical values, that is currently set;

a first detection unit that detects a first gesture made by the user for setting the numerical value;

a second detection unit that detects a second gesture made by the user for switching between a rough adjustment mode and a fine adjustment mode, the rough adjustment mode being a mode in which the range is a first range or range, in which a unit change width for the numerical value is a first change width, or in which the range is the first range and the unit change width for the numerical value is the first change width, the fine adjustment mode being a mode in which the range is a second range narrower than the first range, in which the unit change width is a second change width narrower than the first change width, or in which the range is the second range narrower than the first range and the unit change width is the second change width narrower than the first change width;

a numerical value change unit that changes the numerical value in accordance with the first gesture; and a mode switching unit that switches between the rough adjustment mode and the fine adjustment mode in accordance with the second gesture.

20. An operation method for a control apparatus for a head-mounted display that is worn on a head of a user to allow the user to recognize an augmented reality space obtained by merging a real space with a virtual space, comprising:

a display control step of causing at least one numerical value setting user interface to be displayed on the head-mounted display as a virtual user interface that is virtually recognized by the user in the augmented reality space, the numerical value setting user interface being constituted by a range display part that shows a range of settable numerical values and a numerical value indication part that points a numerical value, among the numerical values, that is currently set;

a first detection step of detecting a first gesture made by the user for setting the numerical value;

a second detection step of detecting a second gesture made by the user for switching between a rough adjustment mode and a fine adjustment mode, the rough adjustment mode being a mode in which the range is a first range, in which a unit change width for the numerical value is a first change width, or in which the range is the first range and the unit change width for the numerical value is the first change width, the fine adjustment mode being a mode in which the range is a second range narrower than the first range, in which the unit change width is a second change width narrower than the first change width, or in which the range is the second range narrower than the first range and the unit change width is the second change width narrower than the first change width;

a numerical value change step of changing the numerical value in accordance with the first gesture; and a mode switching step of switching between the rough adjustment mode and the fine adjustment mode in accordance with the second gesture.

* * * * *